(12) United States Patent
Wu et al.

(10) Patent No.: US 12,676,008 B2
(45) Date of Patent: Jul. 7, 2026

(54) DETECTING HAZARDS BASED ON DISPARITY MAPS USING MACHINE LEARNING FOR AUTONOMOUS MACHINE SYSTEMS AND APPLICATIONS

(71) Applicant: NVIDIA Corporation, Santa Clara, CA (US)

(72) Inventors: Yue Wu, Mountain View, CA (US); Liwen Lin, Santa Clara, CA (US); Xin Tong, Santa Clara, CA (US); Gang Pan, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 500 days.

(21) Appl. No.: 17/733,508

(22) Filed: Apr. 29, 2022

(65) Prior Publication Data

US 2023/0351769 A1 Nov. 2, 2023

(51) Int. Cl.
G06V 20/58 (2022.01)
G06T 7/55 (2017.01)
(Continued)

(52) U.S. Cl.
CPC ............... G06V 20/58 (2022.01); G06T 7/55 (2017.01); G06V 10/761 (2022.01);
(Continued)

(58) Field of Classification Search
CPC .... G06V 20/58; G06V 10/761; G06V 10/762; G06V 10/764; G06V 20/56; G06V 10/82;
(Continued)

(56) References Cited

U.S. PATENT DOCUMENTS 8,923,605 B2 * 12/2014 You ...................... H04N 13/204
382/154
10,885,698 B2 1/2021 Muthler et al.
(Continued)

FOREIGN PATENT DOCUMENTS

| EP | 3282389 A1 | 2/2018 |
|----|------------|--------|
| EP | 3336754 A2 | 6/2018 |
| JP | 6340850 B2 | 6/2018 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

(Continued)

*Primary Examiner* — Samir A Ahmed
(74) *Attorney, Agent, or Firm* — SHOOK, HARDY & BACON L.L.P.

(57) ABSTRACT

In various examples, systems and methods for machine learning based hazard detection for autonomous machine applications using stereo disparity are presented. Disparity between a stereo pair of images is used to generate a path disparity model. Using the path disparity model, a machine learning model can recognize when a pixel in the first image corresponds to a pixel in the second image even though the pixel in the two images does not have identical characteristics. Similarities in extracted feature vectors can be computed and represented by a vector similarity metric that is input to a machine learning classifier, along with feature information extracted from the stereo image pair, to differentiate hazard pixels from non-hazard pixels. In some embodiments, a V-space disparity map, where a first axis (Continued)

corresponds to disparity values and the second axis corresponds to pixel rows, may be used to simplify estimation of the path disparity model.

23 Claims, 14 Drawing Sheets

(51) Int. Cl.
| | |
|---|---|
| *G06V 10/74* | (2022.01) |
| *G06V 10/762* | (2022.01) |
| *G06V 10/764* | (2022.01) |
| *B60W 60/00* | (2020.01) |

(52) U.S. Cl.
CPC .......... *G06V 10/762* (2022.01); *G06V 10/764* (2022.01); *B60W 60/0015* (2020.02); *B60W 2420/403* (2013.01); *G06T 2207/20081* (2013.01); *G06T 2207/30261* (2013.01)

(58) Field of Classification Search
CPC ............. G06T 7/55; G06T 2207/20081; G06T 2207/30261; B60W 60/0015; B60W 2420/403
See application file for complete search history.

(56) References Cited

U.S. PATENT DOCUMENTS

| | | | | |
|---|---|---|---|---|
| 11,577,748 | B1 * | 2/2023 | Wang | B60W 60/001 |
| 2014/0086477 | A1 | 3/2014 | You et al. | |
| 2016/0014406 | A1 | 1/2016 | Takahashi et al. | |
| 2016/0253575 | A1 | 9/2016 | Kakegawa et al. | |
| 2017/0124725 | A1 * | 5/2017 | Sumiyoshi | G06V 20/588 |
| 2017/0359561 | A1 * | 12/2017 | Vallespi-Gonzalez | H04N 13/239 |
| 2018/0018528 | A1 | 1/2018 | Xie et al. | |
| 2018/0204345 | A1 | 7/2018 | Motohashi et al. | |
| 2018/0268229 | A1 * | 9/2018 | Nakata | G06V 20/58 |
| 2018/0330481 | A1 * | 11/2018 | Watanabe | G06T 7/00 |
| 2019/0012798 | A1 | 1/2019 | Amano et al. | |
| 2019/0019044 | A1 * | 1/2019 | Motohashi | G08G 1/16 |
| 2019/0266745 | A1 * | 8/2019 | Gomezcaballero | G06T 7/12 |
| 2019/0279386 | A1 | 9/2019 | Motohashi et al. | |
| 2020/0250984 | A1 | 8/2020 | Kundu et al. | |
| 2021/0122367 | A1 * | 4/2021 | Yao | G06T 7/593 |
| 2021/0264175 | A1 * | 8/2021 | Zhang | G08G 1/166 |
| 2021/0303875 | A1 * | 9/2021 | Bangalore Ramaiah | G06V 20/58 |
| 2021/0326694 | A1 * | 10/2021 | Wang | G06T 7/593 |
| 2022/0103801 | A1 * | 3/2022 | Bell | H04N 13/20 |
| 2022/0383644 | A1 | 12/2022 | Takano et al. | |
| 2022/0415057 | A1 | 12/2022 | Kono et al. | |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

Fritsche, P., et al., "Fusion of radar, LiDAR and thermal information for hazard detection in low visibility environments," In Proceedings of the 2017 IEEE International Symposium on Safety, Security and Rescue Robotics (SSRR), Shanghai, China, pp. 6 (Oct. 11-13, 2017).

IEC 61508, "Functional Safety of Electrical/Electronic/ Programmable Electronic Safety-related Systems," Retrieved from Internet URL: https://en.wikipedia.org/wiki/IEC_61508, accessed on Apr. 1, 2022, 7 pages.

Irani, M., et al., "Direct recovery of planar-parallax from multiple frames", IEEE Transactions on pattern analysis and machine intelligence, vol. 24, No. 11, pp. 1528-1534 (Nov. 2002).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

Lis, K., et al., "Detecting the unexpected via image resynthesis", In: Proceedings of the IEEE International Conference on Computer Vision, pp. 2152-2161 (2019).

Pinggera, P., et al., "Lost and Found: Detecting Small Road Hazards for Self-Driving Vehicles," in IROS, pp. 8 (Sep. 15, 2016).

Ramos, S., et al., "Detecting unexpected obstacles for self-driving cars: Fusing deep learning and geometric modeling," in Proc. IEEE Intell. Vehicles Symp. (IV), pp. 8 (Dec. 20, 2016).

U.S. Appl. No. 17/456,835, "Multi-View Geometry-Based Hazard Detection for Autonomous Systems and Applications", of Minwoo Park, filed on Nov. 29, 2021.

Final Office Action received for U.S. Appl. No. 17/733,497, mailed on Dec. 27, 2024, 30 pages.

Non-Final Office Action received for U.S. Appl. No. 17/733,497, mailed on Aug. 12, 2024, 28 pages.

Non-Final Office Action received for U.S. Appl. No. 17/733,497, mailed on Apr. 7, 2025, 29 pages.

Notice of Allowance received for U.S. Appl. No. 17/733,497, mailed on Jul. 29, 2025, 12 pages.

* cited by examiner

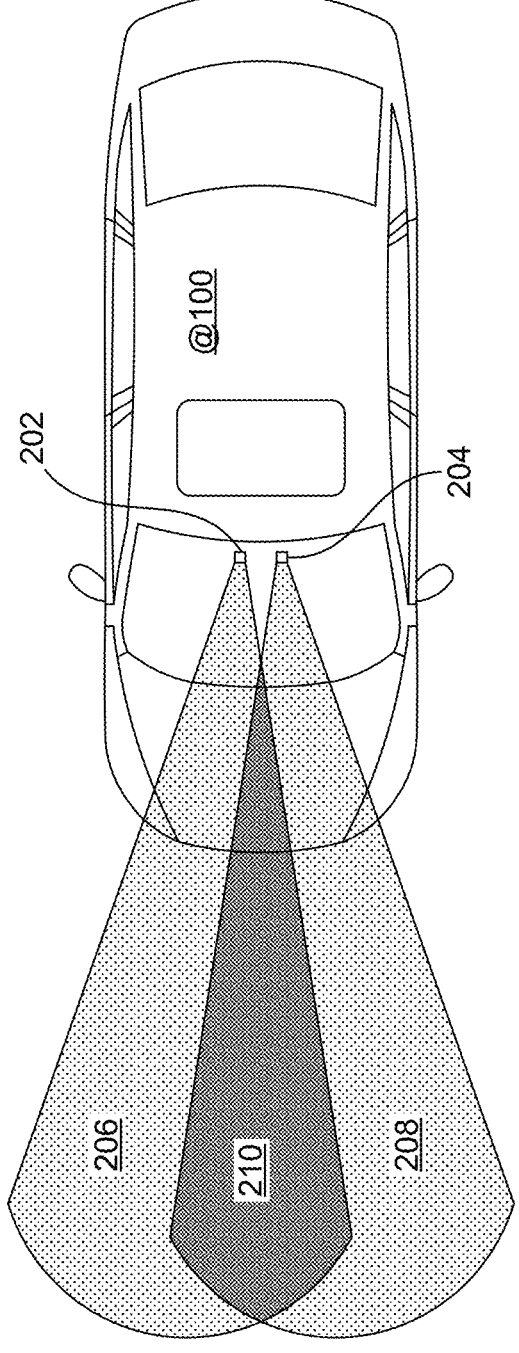
FIGURE 2

102

STEREO DISPARITY MACHINE LEARNING
HAZARD DETECTOR

ROI FILTER
310

BLOCKWISE DIVIDER
312

DISPARITY MAPPING
314

PATH DISPARITY
MODELING
316

MACHINE LEARNING FEATURE VECTOR
EVALUATOR
318

FEATURE VECTOR
PROCESSING
330

ELEMENT
CLASSIFICATION
332

HAZARD ELEMENT
CLUSTERING
320

HAZARD LOCATION
MEMORY
322

500

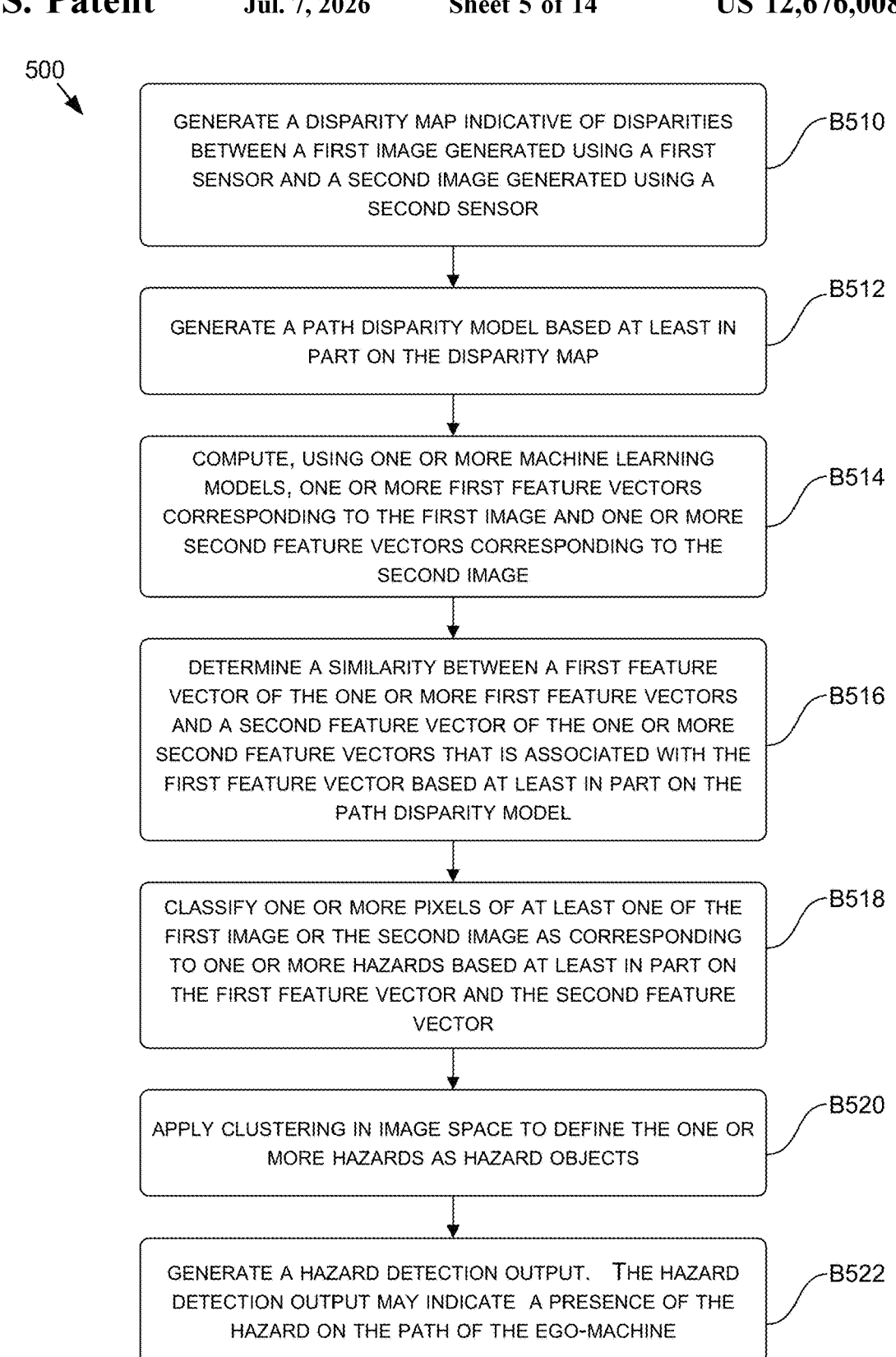

GENERATE A DISPARITY MAP INDICATIVE OF DISPARITIES BETWEEN A FIRST IMAGE GENERATED USING A FIRST SENSOR AND A SECOND IMAGE GENERATED USING A SECOND SENSOR — B510

GENERATE A PATH DISPARITY MODEL BASED AT LEAST IN PART ON THE DISPARITY MAP — B512

COMPUTE, USING ONE OR MORE MACHINE LEARNING MODELS, ONE OR MORE FIRST FEATURE VECTORS CORRESPONDING TO THE FIRST IMAGE AND ONE OR MORE SECOND FEATURE VECTORS CORRESPONDING TO THE SECOND IMAGE — B514

DETERMINE A SIMILARITY BETWEEN A FIRST FEATURE VECTOR OF THE ONE OR MORE FIRST FEATURE VECTORS AND A SECOND FEATURE VECTOR OF THE ONE OR MORE SECOND FEATURE VECTORS THAT IS ASSOCIATED WITH THE FIRST FEATURE VECTOR BASED AT LEAST IN PART ON THE PATH DISPARITY MODEL — B516

CLASSIFY ONE OR MORE PIXELS OF AT LEAST ONE OF THE FIRST IMAGE OR THE SECOND IMAGE AS CORRESPONDING TO ONE OR MORE HAZARDS BASED AT LEAST IN PART ON THE FIRST FEATURE VECTOR AND THE SECOND FEATURE VECTOR — B518

APPLY CLUSTERING IN IMAGE SPACE TO DEFINE THE ONE OR MORE HAZARDS AS HAZARD OBJECTS — B520

GENERATE A HAZARD DETECTION OUTPUT.  THE HAZARD DETECTION OUTPUT MAY INDICATE  A PRESENCE OF THE HAZARD ON THE PATH OF THE EGO-MACHINE — B522

FIGURE 5

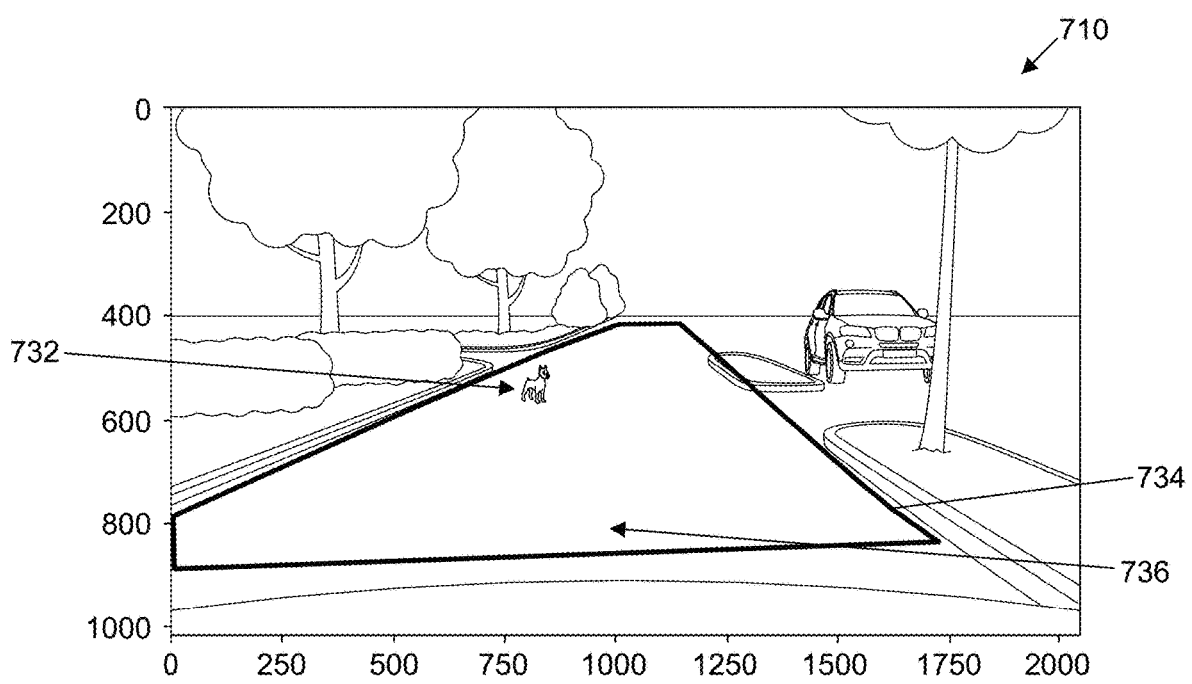
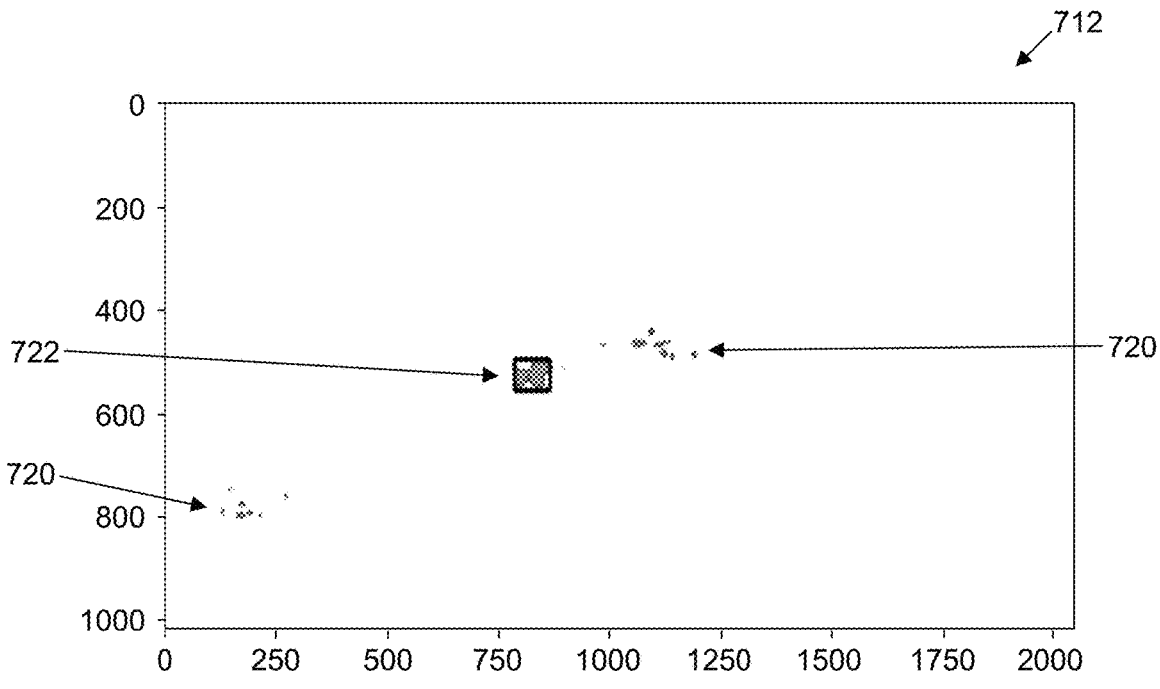
FIGURE 7

800

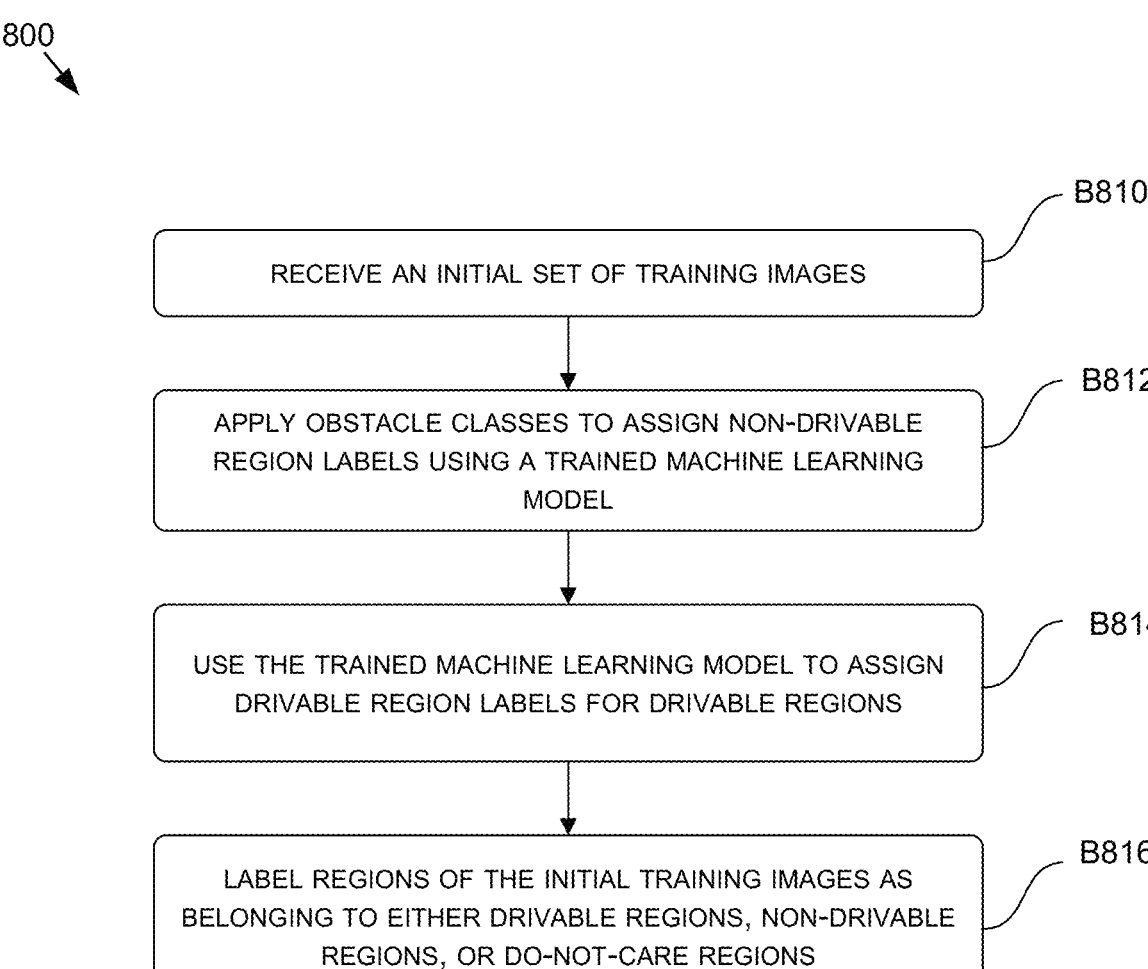

B810

RECEIVE AN INITIAL SET OF TRAINING IMAGES

B812

APPLY OBSTACLE CLASSES TO ASSIGN NON-DRIVABLE REGION LABELS USING A TRAINED MACHINE LEARNING MODEL

B814

USE THE TRAINED MACHINE LEARNING MODEL TO ASSIGN DRIVABLE REGION LABELS FOR DRIVABLE REGIONS

B816

LABEL REGIONS OF THE INITIAL TRAINING IMAGES AS BELONGING TO EITHER DRIVABLE REGIONS, NON-DRIVABLE REGIONS, OR DO-NOT-CARE REGIONS

DETECTING HAZARDS BASED ON DISPARITY MAPS USING MACHINE LEARNING FOR AUTONOMOUS MACHINE SYSTEMS AND APPLICATIONS

CROSS-REFERENCE TO RELATED APPLICATIONS

This patent application is related to U.S. patent application Ser. No. 17/733,497, titled "DETECTING HAZARDS BASED ON DISPARITY MAPS USING COMPUTER VISION FOR AUTONOMOUS MACHINE SYSTEMS AND APPLICATIONS" filed on Apr. 29, 2022.

BACKGROUND

The ability to safely identify and navigate around hazards on a roadway is a critical task for any autonomous or semi-autonomous driving system. For example, an adequate hazard detection system must be robust to different types of hazards and include a high capacity to detect small hazards at a distance to allow an ego-vehicle enough time to avoid a hazard. While some conventional systems are able to detect roadway hazards, these systems require extensive training, rely on inaccurate assumptions, and/or are very expensive to implement.

Parallax-based image processing represents one existing technology currently used for hazard detection. The parallax-based approach uses information derived from two image frames captured at different times by a single camera. For the two image frames to have sufficient parallax information to detect hazard, a vehicle would need to travel a sufficient distance with sufficient time latency between capturing the two image frames. Otherwise the parallax information could be insufficient to be used in the hazard detection with sufficiently high confidence. The Parallax-based technique is also highly dependent on a flat road assumption (that an overlapping road region between the two input image frames is a flat plane) which is not always the case in real situations.

Another existing hazard detection technology leverages a Deep Neural Network (DNN) inference engine. The DNN is trained on the appearance and shapes of hazards to detect when a hazard appears in a captured image. However, given the wide variety of hazards that might be present on a road surface, large amounts of training data are needed, and obtaining such training data is not trivial due to the unknown and unlimited types of potential hazards.

LiDAR-sensor based approaches represent another existing technology currently used for hazard detection. The LiDAR sensor senses the 3D surroundings of the ego-machine to produce, e.g., a point cloud, that it can actively use to detect the existence of a hazard above the road surface. However, LiDAR sensors are expensive and may not be economically practical for autonomous vehicle applications, such as consumer ego-vehicles, for example. Moreover, the density of the point cloud generated by LiDAR reduces with range, which makes it difficult to detect small hazards and/or estimate the hazard size, especially its height dimension, at long range.

While some conventional systems may combine the above approaches, these combinations do not overcome many of the individual shortcomings of these conventional solutions.

SUMMARY

Embodiments of the present disclosure relate to machine learning based hazard detection using stereo disparity for autonomous machine systems and applications. Systems and methods are disclosed that assist an ego-machine in detecting hazards within its path of travel.

In contrast to conventional systems, such as those described above, the systems and methods presented in this disclosure use disparity information between a stereo pair of images to generate a disparity model for the road or path on which an ego-machine is traveling. Using the path disparity model, a machine learning model can recognize when a pixel in the first image corresponds to a particular pixel in the second image (in the sense that both feature vectors represent the same physical real-life feature) even though the pixels as they appear in the two images do not have identical characteristics. Such recognition in correspondence may be measured by a similarity metric between extracted feature vectors of the corresponding pair of pixels from the stereo image pair. Given the path disparity model, a correct correspondence offset can be computed for each pixel of the stereo image pair for pixels representing a position on the path surface, but such a correspondence will not be present for a pixel comprising a hazard. A hazard will produce disparity that deviates from the disparity predicted from the path disparity model. Pixel correspondence information from disparity may be further combined with feature vectors computed by a machine learning model, and may help distinguish hazard pixels from road pixels. Substantial similarity can be expected between a feature vector extracted from the first image and a corresponding feature vector extracted from the second image for road pixels, and substantial dissimilarity expected for hazard pixels (e.g., pixels that correspond to a hazard above or below a road surface). Similarity can be computed and represented, in some embodiments, by a vector similarity metric that is input to a machine learning classifier, along with the feature information extracted from the stereo image pair, to differentiate "hazard" pixels from "non-hazard" pixels. The techniques disclosed herein provide an ego-machine with effective and robust hazard detection because the path disparity model is used to reveal unexpected shifts in features between stereo image pairs, and correspondence information used to augment information extracted from the stereo image pairs.

In some embodiments, blockwise division is used to subdivide the disparity map into a plurality of blocks comprising smaller disparity maps. Disparity of the road surface within each block is considerably less than the disparity of the entire road surface as a whole, so that within each block disparity caused by hazards is more readily distinguishable. Isolated hazard pixels, absent other nearby hazard pixels, may sometimes represent false positives resulting from system noise. These false positives tend to be distributed randomly and sparsely in the image, while true hazard pixels are more densely clustered together. Therefore, in embodiments, a clustering algorithm is applied to those pixels, e.g., in image space, to remove false positive and define clusters of hazard pixels that correlate to real hazard objects on the path of the ego-machine. After hazard detection is performed within each block, the results can then be correlated back to an image of the path surface, and the hazard locations may be used to aid in navigation or control of the ego-machine.

BRIEF DESCRIPTION OF THE DRAWINGS

The present systems and methods for machine learning based hazard detection using stereo disparity for autonomous machine systems and applications are described in detail below with reference to the attached drawing figures, wherein:

FIG. 2 is an illustration of an example of an overlapping field of view (FOV) for a sensor pair, in accordance with some embodiments of the present disclosure;

FIG. 5 is an illustration of an example flow diagram showing a method for machine learning based hazard detection using stereo disparity, in accordance with some embodiments of the present disclosure;

FIG. 7 is an illustration of an example of hazard element clustering, in accordance with some embodiments of the present disclosure;

FIG. 8 is an illustration of an example flow diagram showing a method for training a model for machine learning based hazard detection using stereo disparity, in accordance with some embodiments of the present disclosure;

DETAILED DESCRIPTION

Figure 1:
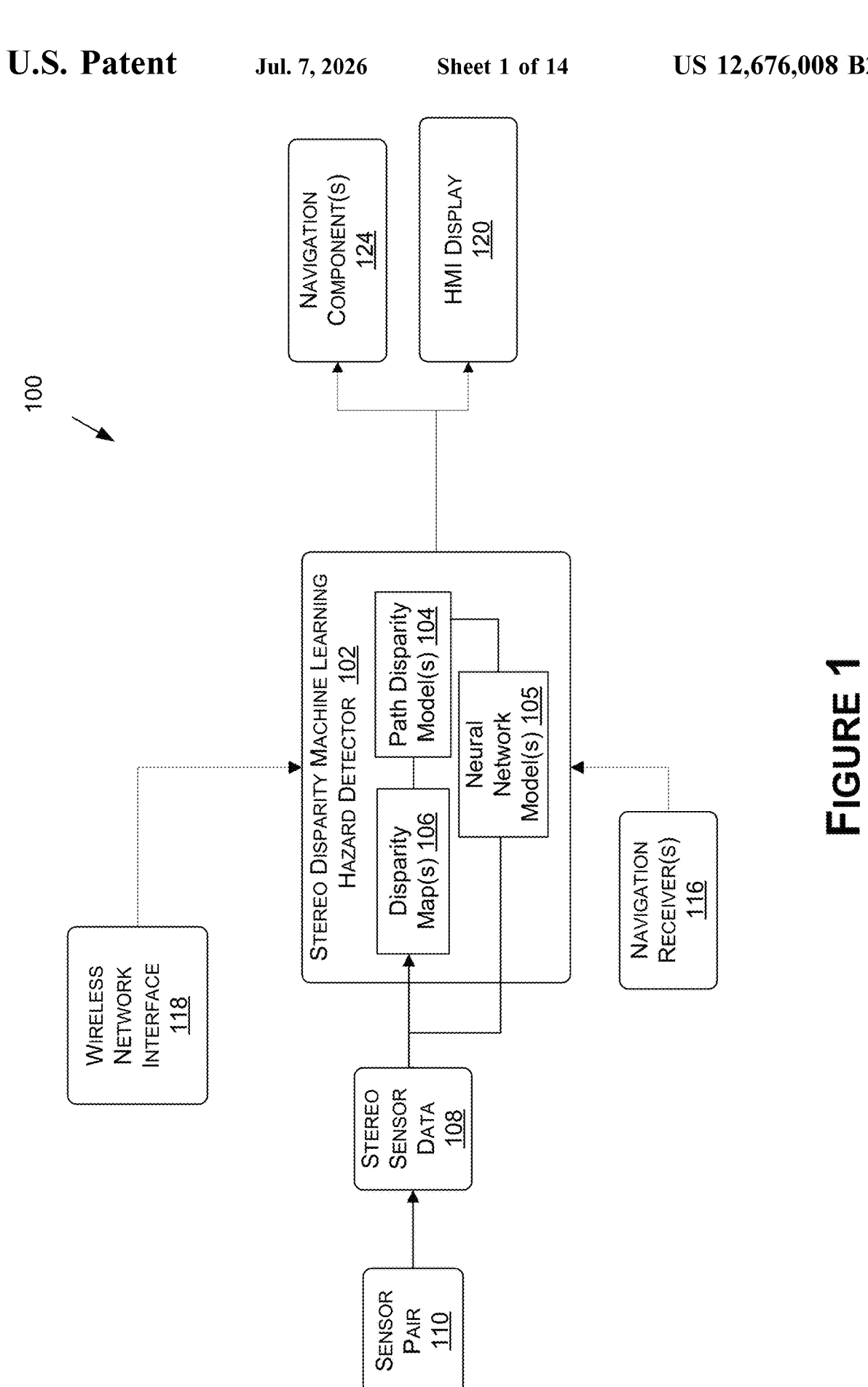
FIG. 1 is an illustration of an example data flow diagram for a learning based hazard detection system of an ego-machine, in accordance with some embodiments of the present disclosure.

Systems and methods are disclosed related to machine learning based hazard detection using stereo disparity for autonomous machine systems and applications. Although the present disclosure may be described with respect to an example autonomous vehicle 900 (alternatively referred to herein as "vehicle 900" or "ego-machine 900," an example of which is described with respect to FIGS. 9A-9D), this is not intended to be limiting. For example, the systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to detecting hazardous objects on an ego-vehicle's path of travel, this is not intended to be limiting, and the systems and methods described herein may be used in augmented reality, virtual reality, mixed reality, robotics, security and surveillance, digital twin and other simulation applications, autonomous or semi-autonomous machine applications, and/or any other technology spaces where hazard or object detection may be used.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, object simulation or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations including digital twinning, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

More specifically, the systems and methods presented in this disclosure assist an ego-machine in detecting hazards within its path of travel. Such hazards may come in the form of foreign material on the roadway, defects in the surface of the roadway, or other vehicles, traffic control objects, wild or free-range animals, and/or pedestrians, that could be present on what is otherwise defined as a permitted path of travel for the ego-machine. Failure to avoid these hazards can result in damage or injury and, as a result, an autonomous machine or semi-autonomous ego-machine operating on public streets and highways is expected to detect and avoid such hazards by either navigating around the hazard, or stopping before the hazard is reached. The ego-machine is expected to employ hazard detection that is robust to different types of hazards and that accurately detects small hazards in the faraway distance well before they are reached by the ego-machine.

In contrast to these existing hazard detection technologies, the systems and methods presented in this disclosure use disparity between a stereo pair of images to generate a baseline road (or path) disparity model. Using the path disparity model, a determination is made to determine if features appearing in one image of the stereo image pair appear in the position predicted by the path disparity model in the other image of the stereo image pair. An offset from the predicted location indicates that a detected feature is not a component of the road, and therefore possibly represents a hazard present on the surface of the road. This offset may also be referred to herein as a "feature offset." A magnitude or other quantitative value for the feature offset can be computed and input to a machine learning classifier, along with feature information extracted from the stereo image pair, to differentiate hazard pixels from non-hazard pixels. These techniques provide an ego-machine with effective and robust hazard detection because they leverage a road (or path) disparity model to detect shifts in feature positions between stereo image pairs and use the feature offset to augment information directly extracted from the images for hazard detection. The path disparity model provides reliable and precise information about the disparity on the road so that hazard pixels can be robustly recognized from the detected feature offsets.

Disparity, or binocular disparity, is a geometric term used in the field of computer vision that refers to the difference in image pixel location of an object as seen in left and right stereo images captured by a camera pair. The numeric value of a computed disparity also reflects object depth away from the cameras, wherein the bigger the disparity, the longer the object. For example, a pair of image sensors O, O', may be set up on an ego-machine with their respective optical axes aligned in parallel to capture a forward facing stereo image pair of the path of the ego-machine. As an example, an object point X observed by the pair of sensors will have a pixel location at (x, y) in the image captured by O, and pixel location (x', y') in the image capture by O'. The images can be rectified to where the image rows are aligned such that $y=y'$. The disparity, d, for that pixel is then defined by the pixel location difference: $d=x-x'$. Moreover, according to the similar triangle principle, the disparity is proportional to sensor focal length, f, and the baseline length, b, between the two sensors, and is inversely proportional to the object depth, Z, which can be expressed as: $d=b*f/Z$. As such, a disparity map for the image pair is constructed in which each element (e.g., each pixel) of the disparity map represents a disparity for a corresponding element of the image captured by O. The resulting disparity map may be of the same size in terms of rows and columns as the captured image and may be referred to, e.g., as an image space disparity map.

Given an ideal road surface that is flat and parallel to the row of the stereo camera system, the disparity, d, of a point on the road can be computed based on its image row: $d=b*f/Z=b*(r-r0)/H$ where d is the disparity at row r, r0 is the row of a principal point, H is the sensor height above the road, and b is the baseline length between the sensors of the sensor paid. The magnitude of a road disparity is linearly correlated by image row. That is, the closer the image row under consideration is to the image bottom, the bigger the disparity will appear.

However, the disparity information in the disparity map may be less accurate or precise than desirable due to a variety of noise sources during the generation process, including sensor calibration and road and/or hazard textures. The techniques in the present disclosure therefore include computing a pattern of road disparity and, from that, building a mathematical path disparity model. For example, a linear model (e.g., a line fitting algorithm) can be applied to describe the road disparity in the disparity map: $d=f(r,c)=f$ (r), where d is the disparity, and f is a function with image row (r), image column (c) as variables. In this way, hazard detection can be accomplished by estimating the path disparity model and identifying offsets in the position of features between the stereo image pairs that do not conform to the path disparity model.

In some embodiments, as an initial operation to generate a disparity map from the stereo images, stereo rectification may be performed to convert the original pair of images to a pair of rectified images having correspondences between their respective image rows so that the search space for computing disparity values can be greatly reduced. There are several known algorithms that may be used for computing disparity values. In one non-limiting embodiment, Semi-Global Matching (SGM) is applied to compute a globally consistent disparity map. Using the SGM algorithm, disparity for each individual pixel is computed based on a matching cost (such as a normalized cross correlation, for example), and a global optimization performed on those computed disparity valued base on a disparity smoothness parameter.

Moreover, in some embodiments, one or more filters may be applied to the captured image pair to constrain processing to a defined region of interest (ROI) that includes the path of the ego-machine. Hazards that pose a risk for the ego-machine include those that exist on the forward portion of the path that the ego-machine is traveling toward (that is, the drivable region of the path as shown in the captured images or other sensor data representations). In some embodiments, the detection ROI can be extracted using freespace detection, lane detection, or other known techniques—e.g., one or more computer vision algorithms, machine learning models, neural networks, and/or the like trained or programmed to identify drivable freespace, lanes, road boundaries, etc. Constraining hazard detection related processing to the ROI avoids waste of computational resources on non-relevant regions of the captured images, thereby leading to more accurate hazard detection, reduced noise, and reduced runtime.

In some embodiments, blockwise division is used to subdivide the disparity map into a plurality of smaller disparity maps, each corresponding to a block of pixels of the disparity map. Typically, a road traveled by an ego-machine is not a flat plane. Rather, it can be expected to slope to either side (e.g., to allow for rain runoff), and have a surface that is not perfectly parallel to the row axis of the captured images. Both of these characteristics contribute to greater road surface disparity. By subdividing and treating each of these blocks as an individual processing unit for hazard detection, the disparity of the road surface itself within each block is considerably less than if the disparity of the entire road surface as captured by the stereo images were considered. After hazard detection is performed within each block, the results can then be correlated back to an image of the road surface within the ROI.

In some embodiments, the dimensions of each block may not be uniform, but may vary as a function of which image rows they comprise. That is, blocks capturing parts of the road or path that are nearer the ego-machine or the sensors thereof (and thus appear towards the bottom of the images) may comprise more image rows than those capturing parts of the road that are farther from the ego-machine (and thus appear towards the top of the images). In some embodiments, the number of image rows within a block may be determined based on detecting a vanishing point where the viewable segment of the road ends, the mounting position of the sensors, and/or having blocks approximately capture equivalent road surface areas.

In some embodiments, to simplify estimation of the path disparity model, the image space disparity map is transformed to an updated (or "V") disparity map. That is, in an image space disparity map, the pixel columns are represented on a first axis (which may referred to at the U axis) and pixel rows are represented on the second axis (which may be referred to as the V axis) and a disparity value at coordinates (u,v) of the disparity map may indicate a disparity associated with an image pixel at coordinates (x,y) of the image as captured by one of the sensors (e.g., either sensor O or O'). In V-disparity space a first axis of the disparity map instead corresponds to disparity values while the second axis again corresponds to pixel rows (the V axis). Each of the one or more elements in the V-disparity map indicates a count of disparity elements in the row of the original image space disparity map.

The image space disparity map appearing within each of the block is accordingly remapped to V-disparity space to generate a V-Disparity map for each respective block. With this mapping, the computed disparity values of the road surface as it appears in a V-Disparity map becomes a smooth line, or even a straight line if the road surface is flat and parallel to the image row. Therefore, a linear model such as a line fitting algorithm may be applied to derive an estimated path disparity model. As an example, in one embodiment, a Random Sample Consensus (RANSAC) line fitting algorithm is applied to the V-Disparity map for each respective block to find a straight line model of the road disparity within each block.

In one embodiment, a first set of one or more feature vectors is computed for features extracted from the first image of the stereo image pair, and a second set of one or more features is computed for features extracted from the second image of the stereo image pair. For example, a Deep Neural Network (DNN) model may be used to extract a feature map of the first image (for example, the left image), and extract a feature map of the second image (for example, the right image). In this way, the DNN computes feature vectors for one or more pixels (e.g., each pixel) of the respective first and second images. Those pixels corresponding to hazards appearing in the stereo image pair are expected have a very different texture and pattern as compared to pixels corresponding to pixels comprising the surface of the road. These differences can be captured and described by the feature vectors computed by the DNN model, which may be trained to recognize such semantic pattern and texture information, and form a first part of the classification information carried by a feature vector to differential a hazard pixel from a road pixel.

Moreover, the DNN model through machine learning can recognize which pixel in the first image corresponds to a pixel in the second image (in the sense that both feature vectors represent the same physical real-life feature) even though the pixel in the two images do not have identical characteristics. For example, because the stereo sensors are offset, one sensor will receive light reflecting off the surface of the road or hazard at a slightly different angle that the other sensor, creating differences in observed luminosity between the two sensors. The DNN model may recognize two pixels as a corresponding pair of pixels representing the same region of a physical feature based on other characteristics of the pixel and/or the context of information from other neighboring or nearby pixels. Such recognition in correspondence may be measured by a similarity metric between the feature vectors of the corresponding pair of pixels from the stereo image pair. As an example, a cosine similarity between feature vectors may be used as a similarity metric. A greater the similarity, the more likely it is that two pixels represented by the two feature vectors are corresponding to the same physical real-life feature.

As mentioned above, a disparity value indicates the pixel correspondence offset between the stereo image pair for the same physical real-life feature. Given the path disparity model, a correct correspondence offset in the one image of the stereo image pair can be computed for each pixel on the second image of the stereo image pair if it is a road pixel, but not for a hazard pixel (a pixel corresponding to a hazard object). A hazard on the path may be revealed by a hazard pixel, which would be a pixel having a larger disparity than the disparity computed from the path disparity model. A lack of predictable correspondence thus indicates that a pixel is not a component of the road and therefor possibly represents a hazard present on the surface of the road, or a deformation in the road surface (e.g., pothole, cavity, etc.). In some embodiments, therefore, a path disparity map is generated from the path disparity model that can be used to provide path disparity for each pixel of one image of the stereo image pair to find its respective correspondence in the other image of the stereo image pair.

In embodiments, pixel correspondence information from disparity may be further combined with the feature vectors computed by the DNN model to help distinguish hazard pixels from road pixels. For example, in one embodiment, a first feature vector (FV1) is extracted for a pixel (P) of a first image of the stereo image pair. A second feature vector (FV2) is extracted for a corresponding pixel of a second image of the stereo image pair, where the corresponding pixel in the second image is determined by applying the path disparity model to the pixel (P) of the first image. A similarity between FV1 and FV2 can then be computed. As discussed above, the path disparity model represents an accurate model to predict correspondence based on the disparity of the path. Accordingly, substantial similarity is expected between FV1 and FV2 if the pixel (P) is a road pixel, and substantial dissimilarity is expected if pixel (P) is a hazard pixel. Therefore, the similarity characteristic of corresponding feature vectors obtained using the path disparity model can further facilitate distinguishing hazard pixels from road pixels during classification. Determination of such similarities between FV1 and FV2 can act as a second part of classification information included with the two associated feature vectors in addition to the first part discussed above. In some embodiments, similarity can be computed and represented by a vector similarity metric that is input to a classifier—such as a machine learning classifier—along with the feature information extracted from the stereo image pair, to differentiate hazard pixels from non-hazard pixels.

The techniques disclosed herein provide an ego-machine with effective and robust hazard detection because the path disparity model is leveraged to compute shifts in pixel location between stereo image pairs and to use that pixel offset to augment information extracted from the stereo image pairs.

Various techniques may then be used to determine whether or not a pixel is classified as a hazard pixel (corresponding to a hazard). For example, a pixel classifier may use simple binary classification of either "hazard" or "non-hazard" based on a magnitude of the vector similarity metric or other quantitative value computed from the feature vector similarity. For example, in some embodiments when a magnitude of the vector similarity metric is less than a similarity threshold, the pixel may be classified as a hazard. When the magnitude of the vector similarity metric is greater than or equal to the similarity threshold, the pixel may be classified as a non-hazard. Moreover, because the magnitude of the similarity may be, at least in part, a function of distance of the object from the sensors, the similarity threshold may vary as a function of image row. The similarity threshold, for example, may be computed as a rectified linear function of the image row. Non-limiting examples of such pixel classifier that may be used to implement simple binary classification include a support vector machine (SVM) or a shallow neural network, which can be trained to distinguish hazard pixels from road pixels based on the two feature vectors that are extracted and associated by the path disparity model.

Alternatively, the pixel classifier may comprise a more robust machine learning model/neural network, such as a Deep Neural Network (DNN), for example, to discern hazard pixels from non-hazard pixels. In that case, the output of the pixel classifier may be an indication of confidence for each pixel as to whether it is a hazard pixel or road pixel. The first and second feature vectors are combined and input applied to the pixel classifier machine learning model. This combined input is provided for each pixel comprised within the region of interest of the original stereo image pair. Therefore, in addition to the semantic information conveyed by each individual two feature vector (FV1 and FV2), the similarity information between the two associated feature vectors (FV1 and FV2) is now further included to help distinguish hazard pixels from road ones in the classification process.

In some embodiments, the classification of pixels as hazards or non-hazards is performed by the machine learning model that extracts the first and second feature vectors from the stereo image pair providing for an end-to-end neural network/machine learning model that inputs the stereo image pair and outputs a classification for one or more pixels (e.g., each pixel) of the stereo image pair, or at least for those pixels within the region of interest. In some embodiments, the pixel classifier applies this pixel classification on a block-by-block basis to each of the individual blocks of pixels of the disparity map, and then outputs a hazard map for each respective block. Alternatively, the output of the pixel classifier may comprise a composite image space hazard map corresponding to the region of interest.

One advantage of using an end-to-end machine learning model is that it can be trained using end-to-end training so that a common ground truth training data set can be used, and so that the feature extraction and pixel classification models are each trained to have a shared understanding of semantic characteristics of hazard pixels versus road pixels. In some embodiments, the one or more machine learning models are trained using ground truth data that comprises consolidated classification labels corresponding to a drivable region, a non-drivable region, and hazards. For example, classification labels for defining the non-drivable region may be based at least in part by one or more obstacle classes, and classification labels for the drivable region may be defined at least in part by a freespace class.

In some embodiments, the ground truth data is optimized for training a machine learning model to discern hazards from non-hazards in the context of a region of interest comprising a path for an ego-machine. That is, it is not so important that the machine learning model be able to classify what type of object a hazard pixel represent. Rather it is sufficient that the machine learning model is able to accurately determine that a given pixel is not a road pixel and from that infer that it is a hazard without regard to what type of hazard. That is, any pixel corresponding to a foreign object on the road surface rather than the road surface, is a candidate for being a hazard pixel. Accordingly, given a premise that the ego-machine will travel on a designated path surface and avoid travel off of that designate path surface, and a region of interest constrained to portions of that path surface, the ground truth training data may omit labeling of individual objects outside of the region of interest as they are irrelevant.

In some embodiments, an automatic labelling process may be implemented to generate optimized ground truth data to facilitate the segmentation of hazards from the stereo image pair, both with respect to computing feature vectors and pixel classification. In one embodiment, the automatic labeling process inputs an initial set of training images and uses a DNN model to apply obstacle classes (e.g. cars and pedestrians) to assign non-drivable region labels. For example the DNN model may comprise a combination of a semantic segmentation neural network model and 2D object detection neural network model, and intersect them to increase non-drivable region labeling accuracy. To generate the labels for drivable regions, the training DNN may comprise a drivable region prediction model from the semantic segmentation neural networks model. As already mentioned herein, the prediction region can be restricted to the region of interest (ROI), which can be determined from a freespace neural networks model. As such, the initial training data can be automatically labeled to distinguish regions as belonging to regions that are either: 1) drivable regions (determine from the intersection of the semantic segmentation of a drivable region, and the region of interest); 2) non-drivable regions (determined from the intersection of semantic segmentation of cars and pedestrian, two-dimensional bounding boxes of cars and pedestrians, and the region of interest); or 3) other (e.g., do not care, or unimportant) regions (e.g., all other regions not included in 1) and 2)). In some embodiments, the labeling of a non-drivable region (which within the ROI would equate to a hazard) may be based on just a subset of that region. For example, using cars and pedestrians as the label of a non-drivable region, the DNN model may over-fit to such objects and only detect them as hazards by using the semantic meaning of such objects. As a result, the model may not recognize the real hazard objects on the road. To disallow the DNN model to utilize such semantic meaning of cars and pedestrian, some embodiments may limit the receptive field of the DNN model and prevent it from seeing the whole object, but instead only part of it (such as tires or a taillight in the case of a car, for example). The receptive field of the extracted feature map may thus be restricted to areas no larger than a predetermined size so that the features do not contain the semantic meaning of any specific real world object. The predetermined size may be smaller than the size of a car, for example, so that the features do not contain the semantic meaning of cars. In some embodiments, to make such a restriction, size of the convolution kernel is limited in the convolutional neural networks and the number of convolutional layers is limited, so that very high level features are not extracted. Smaller receptive fields may also be used for the upper part of the image, which represents smaller objects in the far away regions.

It should be appreciated that when a pixel is classified by the pixel classifier as a hazard pixel, and that pixel is an isolated hazard pixel not adjacent to, or nearby, other hazard pixels, it is likely a false positive resulting from system noise. This is particularly the case for a lone isolated hazard pixel present in a block or image row corresponding to a point on the road near the ego-machine. Noise pixels tend to distribute randomly and sparsely in the image. When many hazard pixels are more densely clustered together, in contrast, they are much less likely false positives. Therefore, in embodiments, a clustering algorithm is applied to those pixels, for example in image space, to remove false positive and define clusters of hazard pixels that correlate to real hazard objects on the path of the ego-machine. A non-limiting example of a type of clustering algorithm is the Density-Based Spatial Clustering of Applications with Noise (DBSCAN) algorithm. DBSCAN groups together points that are closely packed together, removing outlier points in low-density regions with few nearby neighbors. After clustering, an image space bounding shape may be generated around the location of one or more clusters, identifying objects within those bounding shapes as hazards to be avoided by the ego-machine. The bounding shapes may further be correlated back to the original images captured by the sensors, to overlay indications of the detected hazards onto the images, or generate other hazard detection warnings or signals. The hazard detection system may then define locations of the one or more hazards using the clusters of pixels. In some embodiments, a relative position and distance of the detected hazards to the ego-machine may be computed.

The pair of image sensors (O, O') may comprise two or more synchronization cameras mounted on the autonomous vehicles with overlapping Field of View (FOV) regions that include the forward path of travel of the ego-machine. In some embodiments, both cameras share the same optical specifications, such as focal length, and are synchronized and pre-calibrated with their relative pose. In other embodiments, the pair of image sensors (O, O') are synchronized, but have mismatched specifications. For example, the sensors may comprise a stereo camera, and/or combinations of a monocular camera, a surround camera, a fisheye camera, or a wide view camera.

The path travelled by the ego-machine is not limited to any one type of path or surface and may include paths such as a paced road, an unpaved road, a highway, a driveway, a portion of a parking lot, a trail, a track, a walking path, a delineated portion of an environment, or an aircraft runway or landing pad, for example. It should also be understood that the path travelled by the ego-machine may be inside a building or other facility and comprise a hallway, corridor or isle, for example.

The output generated by the hazard detection system may include a hazard detection signal used to display a location of the detected hazard to an operator of the ego-machine, or otherwise used by one or more downstream components of the ego-machine—such as a world model manager, a path planner, a control component, a localization component, an obstacle avoidance component, an actuation component, and/or the like—to perform one or more operations for controlling the ego-machine through an environment. In some embodiments, communication between the hazard detection system and such downstream components of the ego-machine is implemented via an application programing interface (API).

For semi-autonomous ego-machines (or ego-machine operating in a semi-autonomous mode), information about detected hazards can be displayed to the ego-machine operator (e.g., on a heads-up windshield display or other display screen) to assist the operator in deciding how to maneuver the ego-machine to avoid the hazard. Such a display can include a bounding box overlay or other warning graphic superimposed on an image of the path. In other embodiments where the ego-machine has a higher degree of autonomy, the output generated by the hazard detection system comprises a set of data stored to a memory or otherwise transmitted to another ego-machine system that implements hazard avoidance functions. In some embodiments, information about detected hazards, such as their relative position to the ego-machine, may be maintained in memory for a predefined duration or, as a non-limiting example, for as long as the hazard remains within a threshold distance from the ego-machine.

The hazard detection system and corresponding methods may be executed at least in part on one or more processing units coupled to a memory. The processing unit(s) are programmed to execute code to implement one or more of the features and functions of the hazard detection system to compute disparity maps, road (or path) disparity models, classify and cluster pixels, and other functions described herein. While in some embodiments, all processing is performed onboard the ego-machine, in other embodiments, features and functions of the hazard detection system may be distributed and performed by a combination of onboard processors and cloud computing resources, and sensor data obtained from onboard sensors augmented with supplemental data obtained from a data center or other server. In such implementations, the ego-machine further comprises at least one wireless communication interface for coupling the hazard detection system to a wireless communications network.

With reference to FIG. 1, FIG. 1 is an example data flow diagram illustrating the interconnection of components and flow of information or data for machine learning based hazard detection using stereo disparity for an ego-machine (such as autonomous vehicle 900 discussed below with respect to FIG. 9A), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 900 of FIGS. 9A-9D, example computing device 1000 of FIG. 10, and/or example data center 1100 of FIG. 11.

As shown in FIG. 1, the hazard detection system executing the process 100 includes a stereo disparity machine learning hazard detector 102 that receives, as input, stereo sensor data 108 captured by a sensor pair 110. The stereo disparity machine learning hazard detector 102 processes the stereo sensor data 108 to ascertain a path disparity model 104 from one or more disparity maps 106. The stereo disparity machine learning hazard detector 102 processes the stereo sensor data 108 with one or more neural network models 105 to compute pairs of feature vectors for features extracted from the stereo sensor data 108. As further explained herein, stereo disparity machine learning hazard detector 102 utilizes the combination of feature vectors and the path disparity model 104 to detect hazards on the surface of the path, or caused by defects in the path itself. In this example, the stereo sensor data 108 may be derived from one or more on-board sensor pairs 110 of an ego-machine (e.g., ego-machine 900 of FIGS. 9A-9D).

For example, with reference to FIG. 2, FIG. 2 illustrates an overlapping field of view (FOV) for a pair of cameras of vehicle 900, in accordance with some embodiments of the present disclosure. FIG. 2 includes vehicle 900, camera 202, camera 204 (which together form the sensor pair 110), field of view (FOV) 206, field of view (FOV) 208, and overlapping field of view (FOV) region 210. For example, cameras 202 and 204 may be synchronized stereo cameras that may be mounted on the vehicle 900—such as on a windshield or other area of the vehicle 900. The two cameras 202 and 204 may execute a cross-camera optical flow (OF) tracking algorithm to extract stereo disparity information from pairwise images. The camera 202 may provide the FOV 206 to the system and the camera 204 may provide the FOV 208 to the system. In some embodiments, cross-camera OF tracking may be executed at least in the overlapping FOV region 210 of the cameras 202 and 204. The overlapping FOV region 210 covers the defined region of interest (ROI) that includes the path of the ego-machine. Based on a disparity between pixels in the camera image data in the overlapping FOV region 210 for a particular location, the system may determine both the path disparity model 104 and the disparity maps 106.

The output from the stereo disparity machine learning hazard detector 102 may include a hazard detection output indicative of hazard on the path of the ego-machine. The hazard detection output may further include a location of the detected hazard, such as a relative position of the hazard with respect to the ego-machine. This hazard detection output may be used by one or more downstream navigation components 124 of the ego-machine such as the controller(s) 936 discussed below. The downstream navigation components 124, for example, may implement hazard avoidance navigation functions and/or world model manager, a path planner, a control component, a localization component, an obstacle avoidance component, an actuation component, and/or the like, to perform operations for controlling the ego-machine through an environment. The hazard detection output may also, or instead, be input by a human-machine interface (HMI) 120 comprising a display (e.g., on a heads-up windshield display or other display screen) to the operator of the ego-machine. In embodiments, the relative position of detected hazards can be displayed to the HMI display 120 to assist the operator in deciding how to navigate the ego-machine.

In some embodiments, the stereo disparity machine learning hazard detector 102 may also receive location information from navigation receiver(s) 116 and/or may be coupled to a wireless network interface 118. The navigation receiver(s) 114 may comprise, as non-limiting examples, a GNSS receiver (e.g., a GPS receiver), satellite navigation system, inertial and/or dead reckoning, or other navigation system. The wireless network interface 924 may be capable of communication over any air interface protocol, such as but not limited to WiFi, 4G LTE, 5G NR, WCDMA, UMTS, GSM, CDMA2000, etc. In some embodiments, the stereo disparity machine learning hazard detector 102 may input location information from the navigation receiver(s) 116 in order to track a motion of the ego-machine with respect to a relative position of a detected object on the path of the ego-machine. For example, in such an embodiment, may keep track of a relative position of a hazard object in memory until the hazard object is no longer within a threshold distance from the ego-machine. In other embodiments, the hazard detection information (for example, hazard size and/or location) may be transmitted via the wireless network interface 118 to a networked hazard tracking server and/or transmitted to another ego-machine system that implements hazard avoidance functions.

Figure 3:
FIG. 3 is an illustration of an example stereo disparity machine learning hazard detector, in accordance with some embodiments of the present disclosure.

Now referring to FIG. 3, FIG. 3 is a block diagram illustrating an example stereo disparity machine learning hazard detector 102 that may be implemented in at least one embodiment. As shown in FIG. 3, the stereo disparity machine learning hazard detector 102 may comprise an ROI filter 310, a blockwise image divider 312, a disparity mapping function 314, a path disparity modeling function 316, a machine learning feature vector evaluator 318, a hazard element cluster function 320, and/or a hazard location memory 322. These various functions of the stereo disparity machine learning hazard detector 102 may be carried out by a processor executing instructions stored in memory and/or executed using similar components, features, and/or functionality to those of example autonomous vehicle 900 of FIGS. 9A-9D, example computing device 1000 of FIG. 10, and/or example data center 1100 of FIG. 11.

The stereo disparity machine learning hazard detector 102 may input the stereo sensor data 108 to compute the path disparity model and feature vectors, as described herein.

In embodiments, an ROI filter 310 may receive the stereo sensor data 108 from the sensor pair 110 and perform an analysis in order to constrain processing to a defined ROI for hazard detection that includes the path of the ego-machine from the overlapping FOV region 210. In some embodiments, the ROI for hazard detection and can be extracted from the stereo sensor data 108 using freespace detection, lane detection, or other known techniques. For example, one or more computer vision algorithms, machine learning models, neural networks, and/or the like may be trained or programmed to identify drivable freespace, lanes, road boundaries, etc. Constraining hazard detection related processing to the ROI avoids waste of computational resources on non-relevant regions of the captured images, thereby leading to more accurate hazard detection, reduced noise, and reduced runtime.

The disparity mapping function 314 inputs the pixels of the ROI extracted by the ROI filter 310 and computes an image space disparity map for the ROI. As previously explained, an object point X observed by the cameras 202 and 204 will have a pixel location at (x, y) in the image captured by camera 202, and pixel location (x', y') in the image capture by camera 204. The stereo image pair represented by the stereo sensor data 108 may be rectified by the disparity mapping function 314 to where the image rows in the stereo image pair are aligned such that $y=y'$. The disparity, d, for that pixel is then defined by the pixel location difference: $d=x-x'$, and is proportional to sensor focal length, f, and the baseline length, b, between the two sensors 202 and 204, and is inversely proportional to the object depth, Z. The relationship between these parameters can be expressed as: $d=b*f/Z$.

Figure 4:
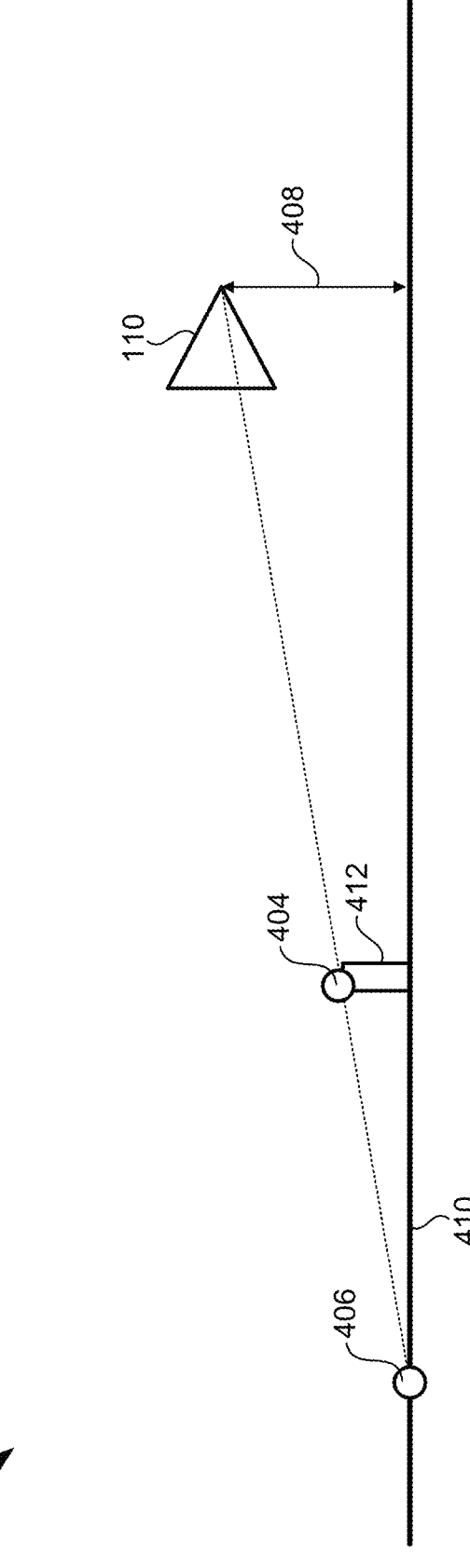
FIG. 4 is an illustration of an example discontinuity in disparity values for detecting a roadway hazard, in accordance with some embodiments of the present disclosure.

FIG. 4 illustrates an example 400 of a discontinuity in disparity values for detecting a roadway hazard, in accordance with some embodiments of the present disclosure. FIG. 4 includes sensor pair 110, pixel 404, pixel 406, height 408, path 410 (e.g., a roadway), and an object 412. In general, the height of object 412 may cause an occlusion of the path 410 behind the object 412 from a perspective of the sensor pair 110. As such, when the object 412 is present, there may be a discontinuity in disparity values indicative of a distance jump between the pixel 404 corresponding to a top of the object 412 and the pixel 406 immediately above the pixel 404—e.g., because the distance from the camera 402 to the pixel 404 is different from the distance to the pixel 406, and the camera 402 may not be able to accurately capture the portions of the roadway 410 occluded by the object 412.

Several known algorithms may be used for computing disparity values. In one embodiment, Semi-Global Matching (SGM) may be applied to the ROI to compute a globally consistent image space disparity map. With the SGM algorithm, disparity for each individual pixel is computed based on a matching cost (such as a normalized cross correlation, for example), and a global optimization performed on those computed disparity valued base on a disparity smoothness parameter. As such, disparity mapping function 314 constructs an image space disparity map for the image pair is constructed in which each element (e.g., pixel) of the disparity map represents a disparity for a corresponding element of the image of the ROI.

The blockwise image divider 312 functions to subdivide the ROI and image space disparity map into a plurality of blocks. Each of these blocks may then be treated as an individual processing unit for hazard detection. By subdividing the image space disparity map and performing hazard detection on a block-by-block basis, the disparity of the road surface itself within each block is considerably less than if the entirety of the image space disparity map was directly evaluated. In some embodiments, block dimensions may vary as a function of the image rows they comprise. Blocks capturing parts of the road or path that are nearer the ego-machine or the sensors thereof may comprise more image rows than those capturing parts of the road that are farther from the ego-machine. The number of image rows within a block may be determined based on several factors, for example, by detecting a vanishing point where the viewable segment of the road ends, the mounting position of the sensors, and/or having blocks approximately capture equivalent road surface areas.

While it is possible to detect hazards directly from the image space diversity map, it may contain considerable errors due to a variety of noise sources during the generation process, including sensor calibration and road and/or hazard textures. The path disparity modeling function 316 addresses these errors by computing a pattern of disparity for the path traveled by the ego-machine, and from that builds a mathematical path disparity model. For example, in embodiments, for each of the plurality of blocks that the blockwise image divider 312 defines from the image space disparity map, the path disparity modeling function 316 applies a linear model, such as map: $d=f(r,c)=f(r)$, where d is the disparity, and f is a function with image row (r), image column (c) as variables. More specifically, the image space disparity map appearing within each of the blocks is updated by remapping image space disparity to V-disparity space. The result is a V-disparity map for each respective block. The computed disparity values of the road surface as it appears in the V-disparity map for each block becomes a smooth line, or even a straight line if the road surface is flat and parallel to the image row. In one embodiment, the Random Sample Consensus (RANSAC) line fitting algorithm is applied to the V-disparity map for each respective block to find a straight line model of the road disparity within each block.

Given the computed path disparity models, a path disparity map may be generated by the path disparity modeling function 316 that can be used to provide path disparity for each pixel of one image of the stereo image pair to find its respective correspondence in the other image of the stereo image pair. Vector similarity metrics may then be computed to augment semantic (e.g. texture and pattern) classification information.

In some embodiments, the machine learning feature vector evaluator 318 comprises a feature vector processing function 330 and an element classification function 332, each of which may be implemented at least in part by a DNN model. The feature vector processing function 330 inputs the stereo image pair (e.g. from the stereo image data 108) to extract a feature map of the first image (for example, the left image), and extract a feature map of the second image (for example, the right image). A first set of feature vectors is computed for features extracted from the first image of the stereo image pair, and a second set of features is computed for features extracted from the second image of the stereo image pair. Pixels that represent hazards appearing in the stereo image pair are expected have a distinguishable texture and pattern characteristics as compared to pixels representing the surface of the path. These distinguishing characteristics can be captured and described by the feature vectors computed by the DNN model implementing the feature vector processing function 330, which may be trained to recognize such semantic information and texture information. For example, for a given pixel (P) of the first image of the stereo image pair, a corresponding pixel of the second image of the stereo image pair is determined based on the path disparity model and/or path disparity map. A first feature vector (FV1) is extracted for the pixel (P) of the first image and a second feature vector (FV2) is extracted for the pixel determined to be the corresponding pixel to pixel (P) in the second image. The two feature vectors FV1 and FV2 are thus associated feature vectors in that they are associated by the path disparity model. The feature vector processing function 330 determines the similarity between FV1 and FV2, which may be computed to produce a vector similarity metric. In some embodiments, this vector similarity metric may be computed for each pixel of the first image of the stereo image pair. For any given pixel, a substantial similarity is expected between FV1 and the corresponding FV2 of the pixel is a road pixel, and substantial dis-similarity is expected if pixel is a hazard pixel. The vector similarity metric may thus be included with the semantic classification information of the FV1 and FV2 feature vectors and provided by the feature vector processing function 330 to the element classification function 332 to differentiate hazard pixels from non-hazard pixels. In some embodiments, the output of the feature vector processing function 330 to the element classification function 332 comprises a feature vector map where for each pixel, the feature vector map includes the FV1 and corresponding FV2 feature vectors including both the semantic classification information and vector similarity information generated by the feature vector processing function 330.

In some embodiments, the element classification function 332 processes the FV1 and corresponding FV2 feature vectors (including both the semantic classification information and vector similarity information) for each pixel and when a magnitude of the vector similarity metric at a pixel is less than a similarity threshold, the element classification function 332 classifies that pixel as a hazard pixel. The similarity threshold may differ for different pixels of the image because the amount of similarity expected will vary as a function of distance of the object from the sensors. Non-limiting examples of such pixel classifier that may be used to implement simple binary classification include a support vector machine (SVM) or a shallow neural network, which can be trained to distinguish hazard pixels from road pixels based on the two feature vectors that are extracted and associated by the path disparity model.

In other embodiments, element classification function 332 may comprise a machine learning model/neural network, such as DNN model for example, to discern hazard pixels from non-hazard pixels. The output of the element classification function 332 in that case may comprise an indication of confidence for each pixel as to whether it is a hazard pixel or road pixel. The combined input of semantic classification information and vector similarity information for each pixel comprised within the region of interest of the original stereo image pair is used by the element classification function 332 to classify each pixel as a hazard or non-hazard element of the image. In some embodiments, the element classification function 332 applies this pixel classification on a block-by-block basis to each of the individual blocks of pixels of the disparity map, and then outputs a hazard map for each respective block. Alternatively, the output of the element classification function 332 may comprise a composite image space hazard map corresponding to the region of interest.

In some embodiments, the machine learning feature vector evaluator 318 comprises and end-to-end neural network/machine learning model that implements one or more the functions of both the feature vector processing function 330 and element classification function 332 discussed herein.

The hazard element clustering 320 comprises a function (e.g. a clustering algorithm) applied in image space using the classification results computed by the machine learning feature vector evaluator 318, to remove false positive hazard element classifications and define clusters of hazard elements that correlate to real hazard objects on the path of the ego-machine. For example, an isolated hazard pixel, absent other adjacent or nearby hazard pixels, is likely a false positive hazard element classification resulting from system noise. This is particularly the case for an isolated hazard pixel appearing at a point on the path near the ego-machine, where a true hazard object would appear to grow larger as the ego-machine moves closer, and thus be expected to appear in several pixels. Noise pixels tend to distribute randomly and sparsely in the image. When many hazard pixels are more densely clustered together, in contrast, they are much likely less likely false positives, and more likely to be a true hazard object.

An example cluster algorithm that may be applied by the hazard element clustering function 320 is the Density-Based Spatial Clustering of Applications with Noise (DBSCAN) algorithm. In one embodiment, using DBSCAN or an equivalent cluster algorithm, the hazard element clustering 320 groups together elements classified as hazard elements, that are packed together in close proximity in image space, removing elements classified as hazard elements that are otherwise outlier points in low-density regions with few nearby neighbors.

After clustering, the stereo disparity machine learning hazard detector 102 may generate the hazard detection output, for use by one or more downstream navigation components 124 and/or HMI display 120 for example. In some embodiments, the hazard detection output a bounding shape generated by the stereo disparity machine learning hazard detector 102 around the location of one or more clusters defined by the hazard element clustering 320 function. The bounding shape assists in identifying objects appearing on the path of the ego-machine as hazards to be avoided by the ego-machine. The bounding shapes may be correlated back to the original images captured by the sensor pair 110, or other images captured by other sensors of the ego-machine, to overlay indications of the detected hazards onto the images. The hazard detection output may also trigger hazard detection warnings or other signals.

In some embodiments, a relative position and distance of the detected hazards to the ego-machine may be computed and stored as a hazard location in memory 322. In this way, the ego-machine can continue to track the location of nearby detected hazard objects that may no longer appear in current stereo sensor data 108. For example, in some embodiments the stereo disparity machine learning hazard detector 102 may track the movement of the ego-machine based on location information received from navigation receiver(s) 116, and from the tracked movement update the relative position and/or distance of detected hazard objects in the memory 322. In some embodiments, the stereo disparity machine learning hazard detector 102 may keep track of the relative position of one or more detected hazard objects in hazard location in memory 322 for as long as they are within a threshold distance from the ego-machine, and optionally purge them from the memory 322 once they are further away than the threshold distance.

FIG. 5 is a flow diagram showing a method 500 for machine learning based hazard detection using stereo disparity, in accordance with some embodiments of the present disclosure. Each block of method 500, described herein, comprises a computing process that may be performed using any combination of hardware, firmware, and/or software. For instance, various functions may be carried out by a processor executing instructions stored in memory. The method 500 may also be embodied as computer-usable instructions stored on computer storage media. The method 500 may be provided by a standalone application, a service or hosted service (standalone or in combination with another hosted service), or a plug-in to another product, to name a few.

In addition, method 500 is described, by way of example, with respect to the hazard detection system included in the process 100 of FIG. 1. However, this method 500 may additionally or alternatively be executed by any one system, or any combination of systems, including, but not limited to, those described herein. It should therefore be understood that the features and elements described herein with respect to the method 500 of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figures and/or embodiments described herein and vice versa.

The method 500 is drawn to detecting real-world hazardous objects in the path of an ego-machine based on extracted feature vectors and a path disparity model. Generally, the method 500 comprises determining a location of one or more pixels corresponding to one or more hazard objects on a path of an ego-machine based at least in part on classifying the one or more pixels using a first feature vector corresponding to a first image and a second feature vector corresponding to a second image, the first feature vector and the second feature vector determined to correspond to one another based at least in part on a path disparity model computed using a disparity map generated using the first image and the second image.

The method 500 begins at B510 with generating a disparity map indicative of disparities between a first image generated using a first sensor and a second image generated using a second sensor. The first sensor and the second sensor have at least partially overlapping fields of view including at least a portion of a path of an ego-machine. In some embodiments, the method includes receiving a stereo image pair for a region of interest in a path of an ego-machine. The first and second sensors produce the stereo image pair. For example, FIG. 6 at 610 illustrates an image 612 from one of the stereo image pair showing the path 614 traveled by the ego-machine, and a delineated ROI 616 within which hazard detection is performed. At 620, an image space disparity map 622 is shown for the delineated ROI 616. Each pixel of the image space disparity map 622 within the ROI 616 represents the computed disparity for that pixel between the left and right images of the stereo image pair. As indicated by the image space disparity map 622, disparity of the surface of the path 614 inherently increases as points on the surface draw closer to the ego-machine.

Figure 6:
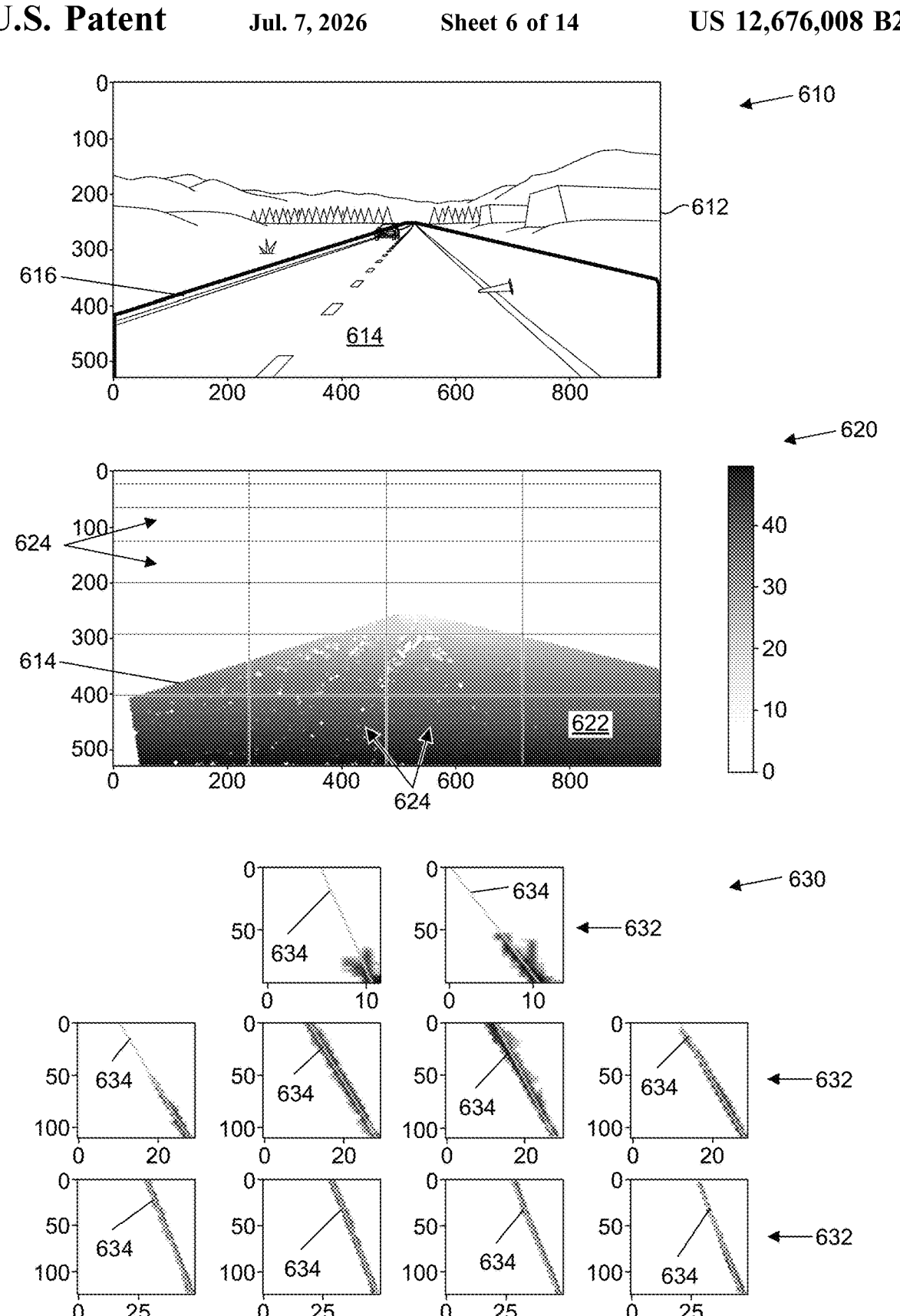
FIG. 6 is an illustration of an example of disparity map generation for machine learning based hazard detection using stereo disparity, in accordance with some embodiments of the present disclosure.

The method 500 at B512 includes generating a path disparity model based at least in part on the disparity map. In some embodiments, to generate the path disparity model, the method applies a blockwise division to the image space disparity map. As shown in FIG. 6 at 620, the blockwise division subdivides the disparity map 622 into a plurality of blocks 624, each comprising a smaller disparity map. Disparity of the road surface within each block 624 is considerably less than the disparity of the entire road surface as a whole, so that within each block 624 disparity caused by hazards is more readily distinguishable. In some embodiments, applying blockwise division may be omitted for at least part of the ROI, for example where the path traveled by the ego-machine is particularly narrow, and/or or substantially flat and smooth (such as where the path is a narrow tiled hallway, for example).

In some embodiments, an updated disparity map comprising a V-space disparity map, which may be equivalently referred to herein as a V-disparity map. FIG. 6 at 630 illustrates a plurality of V-disparity maps 632 each plotting the computed disparity in V-space for one of the blocks 624 of the image space disparity map 622 in which at least a portion of the ROI 616 is included. Each of the plurality of V-disparity maps 632 includes a linear path disparity model 634, which may be computed by performing a line fitting algorithm against the disparity values appearing within that respective block 624. The computed disparity values of the road surface as it appears in the V-disparity map for each block 624 becomes a smooth line, or even a straight line depending on the degree to which the road surface is flat and parallel to the image row. The line representing the path disparity model 634 approximates the best fit line through the V-space plotted disparity values within the block.

When blockwise division is applied, then method 500 at B512 may be performed for each block 624. Else, the method 500 may be performed on the undivided image space disparity map.

The method 500 proceeds to B514 with computing, using one or more machine learning models, one or more first feature vectors corresponding to the first image and one or more second feature vectors corresponding to the second image. For example, a first feature vector (FV1) is extracted for a pixel (P) of a first image of the stereo image pair. A second feature vector (FV2) is extracted for a corresponding pixel of a second image of the stereo image pair. The corresponding pixel in the second image is determined by applying the path disparity model to the pixel (P) of the first image. The two feature vectors FV1 and FV2 are thus associated feature vectors in that they are associated by the path disparity model.

The method 500 at B516 includes determining a similarity between a first feature vector of the one or more first feature vectors and a second feature vector of the one or more second feature vectors that is associated with the first feature vector based at least in part on the path disparity model. The method 500 determines the similarity between FV1 and FV2, which may be computed and expressed as a vector similarity metric. In some embodiments, this vector similarity metric may be computed for each pixel of the first image of the stereo image pair. For any given pixel, a substantial similarity is expected between FV1 and the corresponding FV2 if the pixel is a road pixel, and substantial dis-similarity is expected if pixel is a hazard pixel. The vector similarity metric may be incorporated into the FV1 and FV2 along with the semantic classification information extracted from the stereo image pair.

The method 500 at B518 includes classifying one or more pixels of at least one of the first image or the second image as corresponding to one or more hazards based at least in part on the first feature vector and the second feature vector. The method processes a respective first feature vector FV1 and its corresponding FV2 feature vector for each of the one or more pixels, including both the semantic classification information and vector similarity information. In some embodiments, when a magnitude of the vector similarity metric at a pixel is less than a similarity threshold, the method classifies that pixel as a hazard pixel. When the magnitude of the vector similarity metric at a pixel is greater than the similarity threshold, the method classifies that pixel as a non-hazard pixel (e.g., a road pixel). The similarity threshold may differ for different pixels of the image because the amount of similarity expected will vary as a function of distance of the object from the sensors.

In some embodiments, the method 500 at B518 comprises applying a machine learning model/neural network, such as DNN model for example, to discern hazard pixels from non-hazard pixels. The method may output an indication of confidence for each pixel as to whether it is a hazard pixel or road pixel. The combined input of semantic classification information and vector similarity information for each pixel comprised within the region of interest of the original stereo image pair is used by the DNN model to classify each pixel as a hazard or non-hazard element of the image.

The method 500 may also include, as shown at B520, applying clustering in image space to define the one or more hazards as hazard objects. Clustering is applied to remove false positive hazard element classifications and define clusters of hazard elements that correlate to real hazard objects on the path of the ego-machine. In at least one embodiment, a clustering algorithm is applied to elements classified by the method as hazard elements to generate one or more clusters of hazard elements. Isolated hazard pixels sometimes represent false positives resulting from system noise while true hazard pixels are more densely clustered together. FIG. 7 illustrates example results of applying clustering in image space to define hazard objects. An original image captured by the sensor pair is shown at 710 and the results of clustering shown at 712. Pixels that were classified as hazard pixels by the method at 524, but that do not form clusters, are shown at 720. Pixels that do form a cluster are shown at 722. Such hazard element clusters are considered to represent actual hazard objects on the path of the ego-machine. In some embodiments, the method 500 may identify one or more hazards as being represented by the sensor data based at least in part on correlating the hazard element cluster 722 with the original image from sensor data. For example, the hazard element cluster 722 is an accurate detection of the location of an actual hazard object 732 (in this example, a small dog) within the region of interest 734 within the path 736 of the ego-machine. The method may further apply a clustering algorithm to the one or more pixels and the one or more other pixels to generate clusters of pixels to define locations of the one or more hazards using the clusters of pixels. In some embodiments, the definition of the locations includes generating bounding shapes around each respective cluster of pixels of the clusters of pixels.

The method 500 at B522 may further include generating a hazard detection output. The hazard detection output may indicate a presence of the hazard on the path of the ego-machine. The hazard detection output may include a location of the detected hazard, such as a relative position of the hazard with respect to the ego-machine. This hazard detection output may be used by one or more downstream navigation components to perform one or more automated operations based at least in part on the location of the detected hazards. The hazard detection output may also be sent to an HMI to provide a hazard warning or otherwise assist an operator in deciding how to navigate the ego-machine. As such the method 500 may include performing one or more operations for controlling the ego-machine along the path based at least in part on the one or more hazards.

As previously mentioned, one advantage of using an end-to-end machine learning model is that it can be trained using end-to-end training so that a common ground truth training data set can be used. The image extraction and pixel classification models are each trained to have a shared understanding of the semantic pattern and textural characteristics of hazard pixels versus road pixels. As shown by the method 800 in FIG. 8, in some embodiments, the one or more machine learning models of the machine learning feature vector evaluator 318 may be trained using ground truth data that comprises consolidated classification labels corresponding to a drivable region, a non-drivable region, and hazards. For example classification labels for defining the non-drivable region may be based at least in part on one or more obstacle classes, and classification labels for the drivable region may be defined at least in part by a freespace class. In some embodiments, the ground truth data is optimized by method 800 for training a machine learning model to discern hazards from non-hazards in the context of a region of interest comprising a path for an ego-machine. By starting with a premise that the ego-machine will travel on a designated path surface and avoid travel off of that designate path surface, and that the region of interest is constrained to portions of that path surface, the ground truth training data may omit labeling of individual objects outside of the region of interest as they are irrelevant.

Method 800 thus describes an automatic labelling process that may be implemented to generate optimized ground truth data to facilitate the segmentation of hazards from the stereo image pair. The process may be applied with respect to computing feature vectors, determining similarities between associated feature vectors, and performing pixel classification. The method begins at B810 with receiving an initial set of training images. At B812, the method includes using a trained machine learning model (such as a DNN model, for example) to apply obstacle classes to assign non-drivable region labels. Such obstacle classes may comprise, for example, cars and pedestrians. The trained machine learning model may comprise an intersection of a semantic segmentation neural network model and a 2D object detection neural network model to increase non-drivable region labeling accuracy. The method 800 at B814 includes using the trained machine learning model to assign drivable region labels for drivable regions. The trained machine learning model may comprise a drivable region prediction model from the semantic segmentation neural networks model. The method 800 may include restricting the prediction region to a region of interest (ROI), for which the ROI can be determined from a freespace neural networks model. The method at B816 includes labeling regions of the initial training images as belonging to either drivable regions, non-drivable regions, or do-not-care regions.

The labeling of a non-drivable region may be based on just a subset of that region. For example, using cars and pedestrians as the label of a non-drivable region, the machine learning model may overfit to such objects and only detect them as hazards by using the semantic meaning of such objects. As a result, the model may not recognize the real hazard objects on the road. To disallow the machine learning model to use such semantic meaning of cars and pedestrian, some embodiments may limit the receptive field of the machine learning model in order to prevent the model from seeing the whole object, but instead only part of it (such as tires or a taillight in the case of a car, for example) as previously discussed.

Example Autonomous Vehicle

Figure 9A:
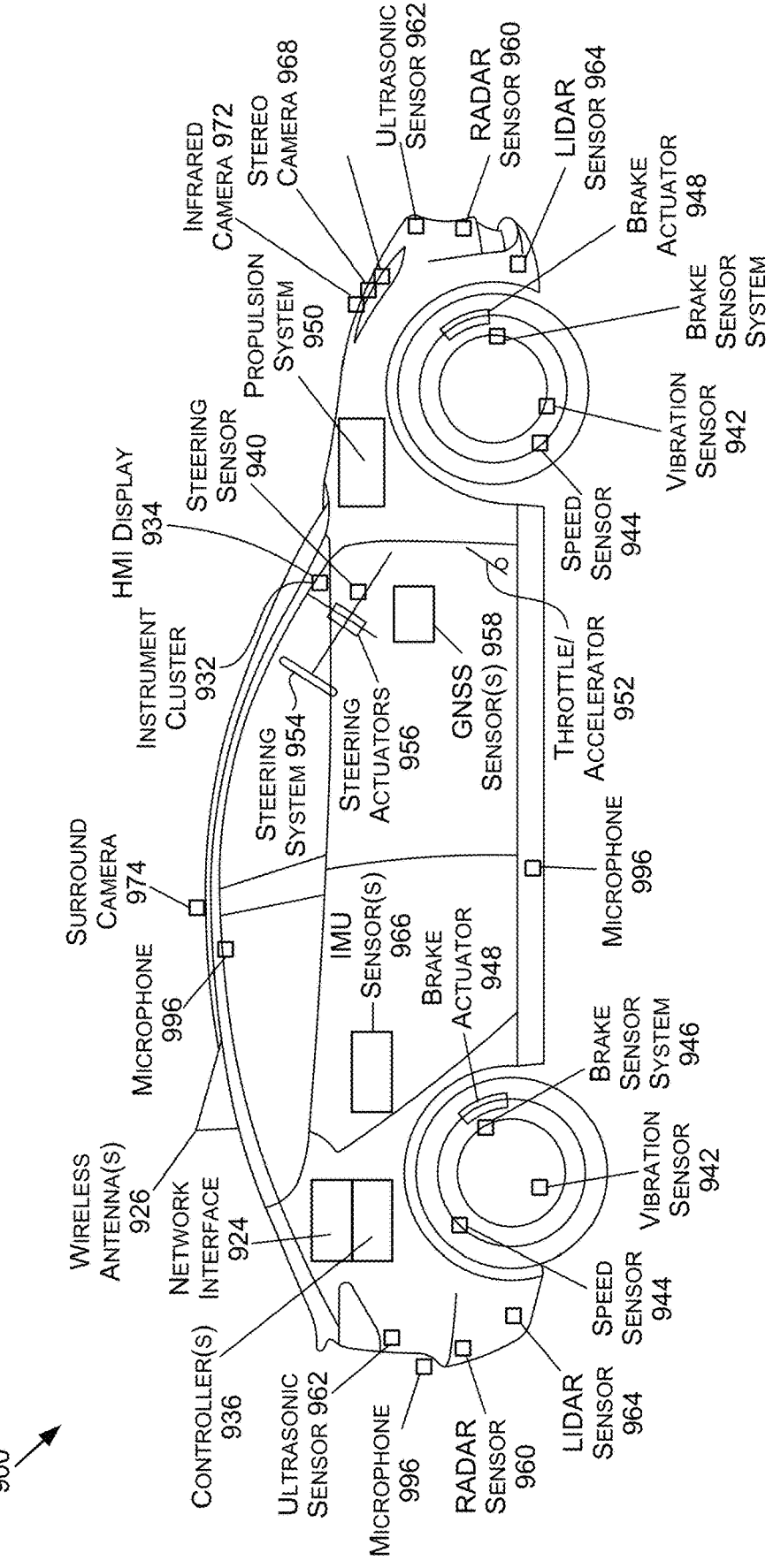
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types. Moreover, the controllers(s) 936 may receive the hazard detection output from the stereo disparity machine learning hazard detector 102 indicative of hazards on the path of the ego-machine and/or the relative position of hazards with respect to the ego-machine.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the HD map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.). Moreover, the HMI display 934 may display bounding shapes or other indications of hazardous objects detected by the stereo disparity machine learning hazard detector 102.

The vehicle 900 further includes a network interface 924 which may use one or more wireless antenna(s) 926 and/or modem(s) to communicate over one or more networks. For example, the network interface 924 may be capable of communication over LTE, WCDMA, UMTS, GSM, CDMA2000, etc. The wireless antenna(s) 926 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc. In some embodiments, the stereo disparity machine learning hazard detector 102 may communicate detected hazardous objects to cloud based services or other ego-machines via the network interface 924.

Figure 9B:
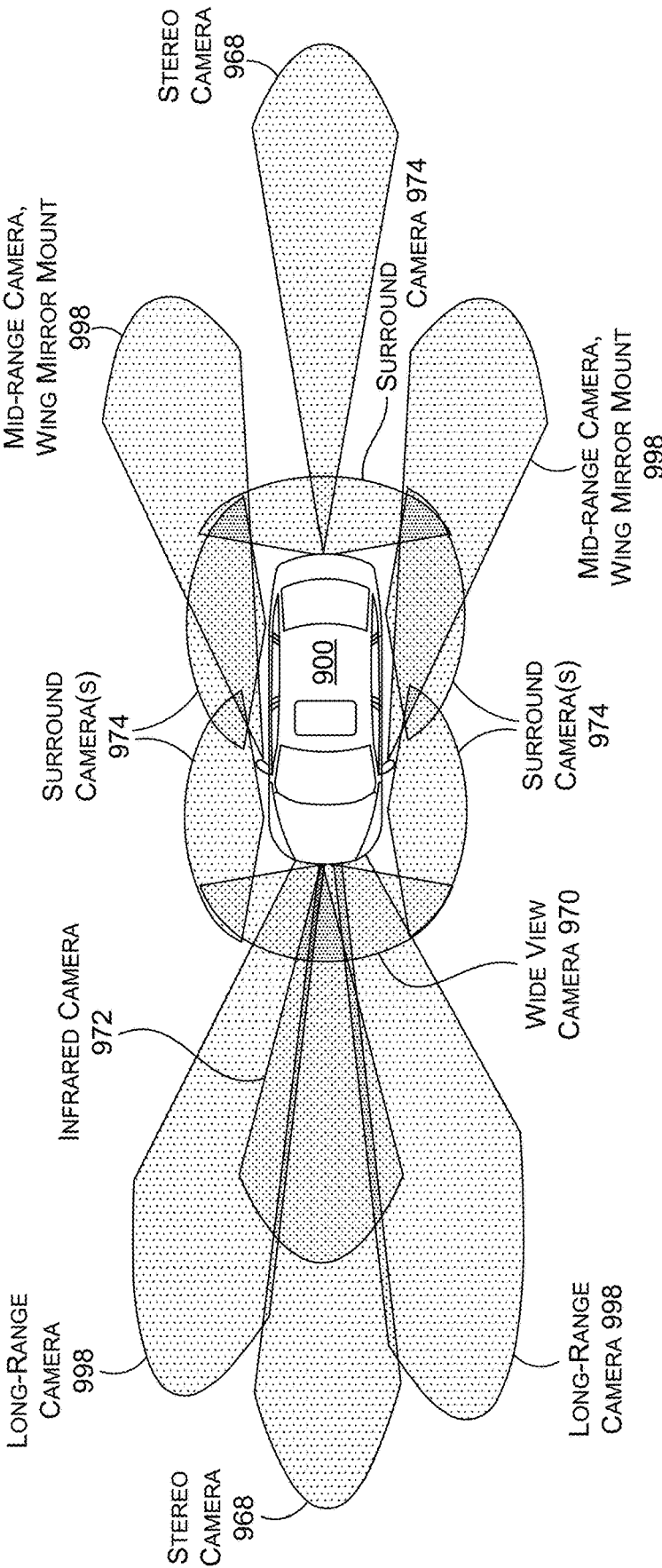
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900. In various embodiments, sets of cameras as illustrated in FIG. 9B may be used as the sensor pair 110 to capture the stereo sensor data 108 that is ultimately input to the stereo disparity machine learning hazard detector 102.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may any number of wide-view cameras 970 on the vehicle 900. In addition, long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

One or more stereo cameras 968 may also be included in a front-facing configuration. The stereo camera(s) 968 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. For example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
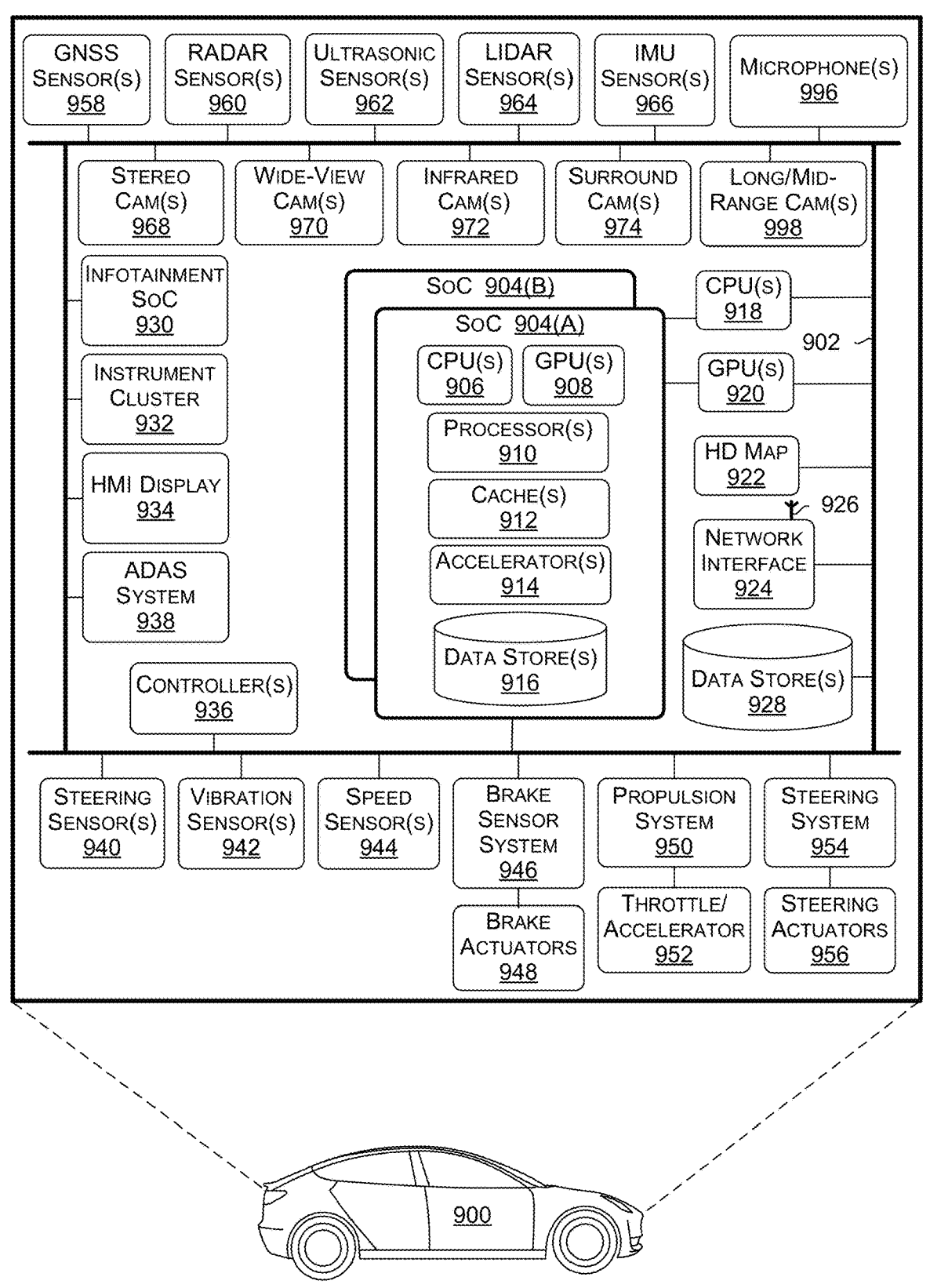
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol.

In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like. For example, features and function of the stereo disparity machine learning hazard detector 102 may be at least in part executed by the one or more controller(s) 936.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))— or other math coprocessor or numeric coprocessor types— for performing mathematical operations within the system. For example, the SoC(s) 904 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.).

The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine.

The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
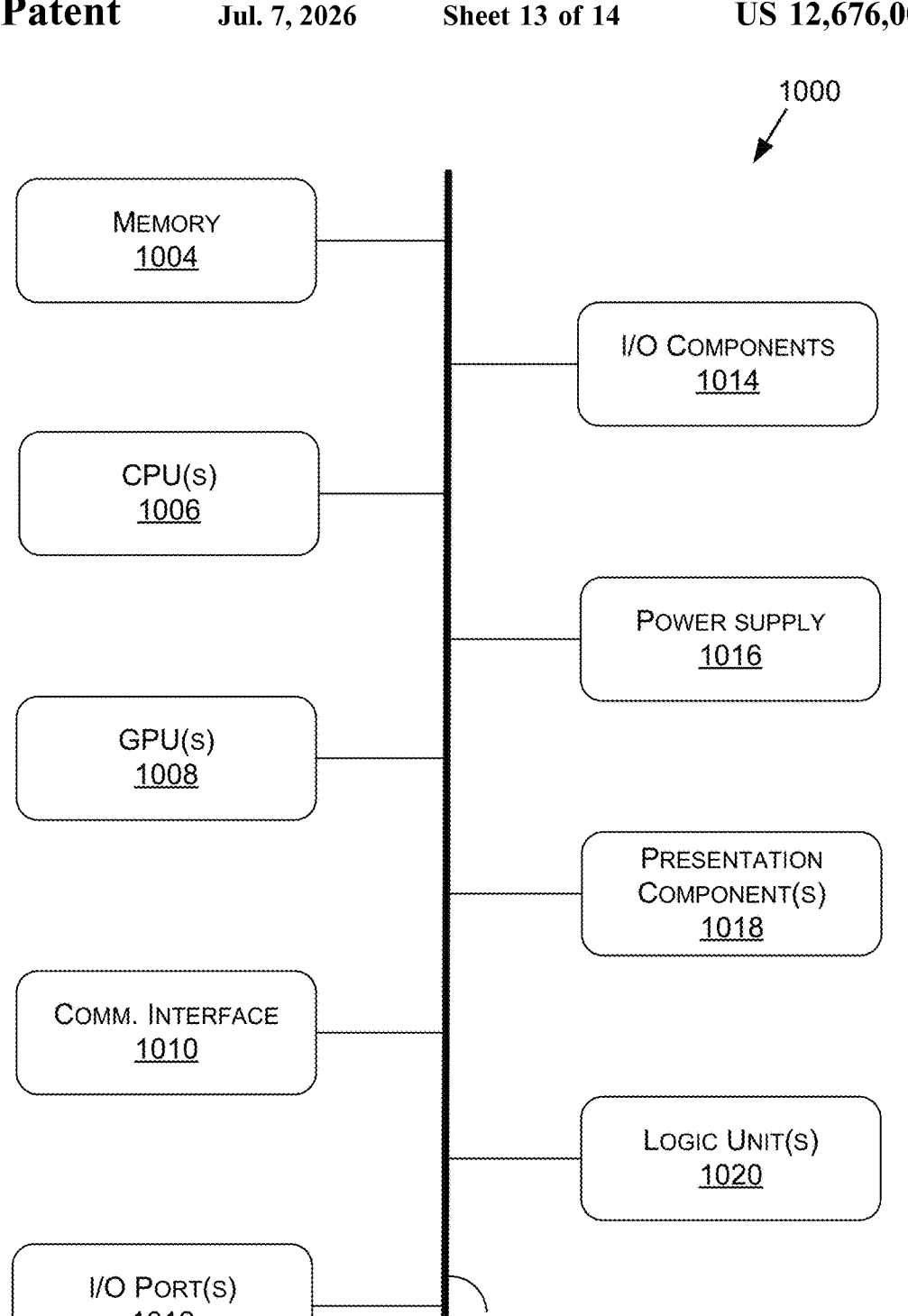
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure, such as but not limited to the stereo disparity machine learning hazard detector 102. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics), to visually display of the hazard detection output from the stereo disparity machine learning hazard detector 102 onto the HMI display 120, or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
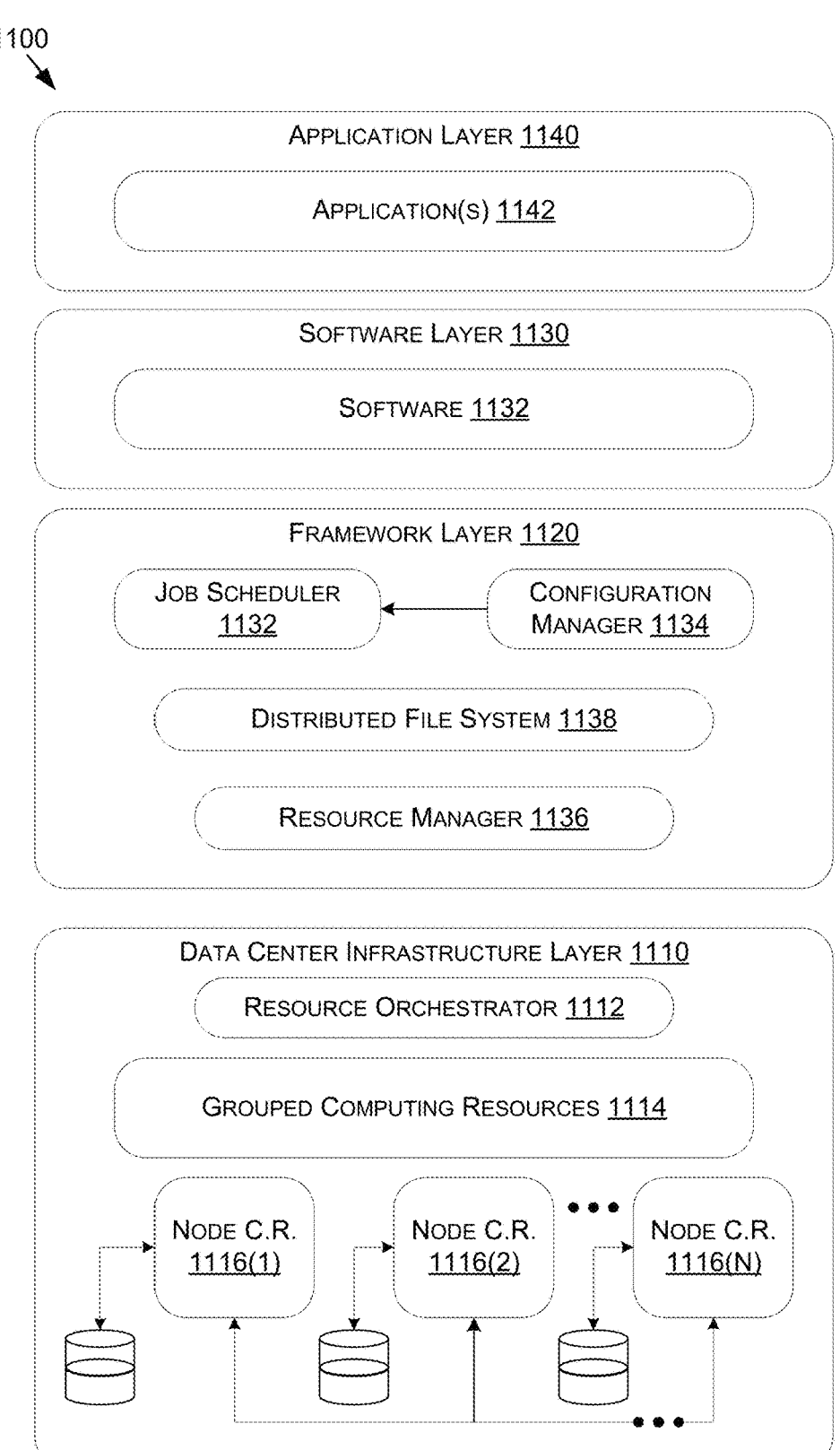
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140. For example, the stereo disparity machine learning hazard detector 102 may exchange detected hazard information with the data center 1100.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1132, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1132 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1132. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising:
one or more circuits to:
generate a disparity map indicative of disparities between pixels of a first image generated using a first sensor and pixels of a second image generated using a second sensor, the first sensor and the second sensor having at least partially overlapping fields of view including at least a portion of a path of an ego-machine;
generate a path disparity model based at least on the disparity map;
extract, based at least on executing one or more first machine learning models, a first feature map of the first image and a second feature map of the second image;
compute, based at least on executing the one or more first machine learning models, a first feature vector corresponding to a first pixel of the first image based at least on the first feature map of the first image and a second feature vector corresponding to a second pixel of the second image based at least on the second feature map of the second image, the second pixel corresponding to the first pixel;
determine a similarity between the first feature vector and the second feature vector that is associated with the first feature vector based at least on applying the path disparity model to the first pixel;
classify at least one of the first pixel or the second pixel as corresponding to one or more hazards based at least on the first feature vector and the second feature vector; and
perform one or more operations for controlling the ego-machine along the path based at least on the one or more hazards.

2. The one or more processors of claim 1, wherein at least one of the first pixel or the second pixel is classified based at least on the one or more first machine learning models processing the first feature vector and the second feature vector; or
wherein at least one of the first pixel or the second pixel is classified based at least on one or more second machine learning models processing the first feature vector and the second feature vector, wherein the one or more second machine learning models are different from the one or more first machine learning models.

3. The one or more processors of claim 1, wherein at least one of the first pixel or the second pixel is classified based at least on the one or more first machine learning models determining an indication of confidence that the first pixel or the second pixel corresponds to a hazard pixel, and the one or more first machine learning models are end-to-end trained.

4. The one or more processors of claim 1, wherein the one or more circuits are further to:
classify one or more other pixels of the first image as corresponding to the one or more hazards;
apply a clustering algorithm to the first pixel and the one or more other pixels to generate one or more clusters of pixels; and
define one or more locations of the one or more hazards based at least on the one or more clusters of pixels.

5. The one or more processors of claim 4, wherein the one or more locations are defined by generating one or more bounding shapes around at least one respective cluster of pixels of the one or more clusters of pixels.

6. The one or more processors of claim 1, wherein at least one of the first pixel or the second pixel is classified based at least on a combined feature vector, wherein the combined feature vector is generated by combining the first feature vector and the second feature vector.

7. The one or more processors of claim 1, wherein the first pixel is within a region of interest that includes the path of the ego machine.

8. The one or more processors of claim 1, wherein the one or more first machine learning models are trained based at least on ground truth data that comprises classification labels corresponding to a drivable region, a non-drivable region, and hazards.

9. The one or more processors of claim 8, wherein a delineation of the non-drivable region from the drivable region is determined based at least on freespace information.

10. The one or more processors of claim 1, wherein the path disparity model is represented in a disparity space including a first axis corresponding to disparity and a second axis corresponding to an image row of at least one of the first image or the second image.

11. The one or more processors of claim 1, wherein the generation of the path disparity model includes applying a line fitting algorithm to at least a portion of the disparity map.

12. The one or more processors of claim 1, wherein the one or more processors are comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);

a system implemented at least partially in a data center, or a system implemented at least partially using cloud computing resources.

13. A system comprising:

a plurality of sensors to generate sensor data;

one or more processing units comprising processing circuitry to:

generate a disparity map indicative of disparities between pixels of a pair of stereo images generated using the plurality of sensors, the plurality of sensors comprising a first sensor and a second sensor having at least partially overlapping fields of view including at least a portion of a path of an ego-machine;

generate a path disparity model based at least on the disparity map;

extract, based at least on executing one or more first machine learning models, a first feature map of a first image of the pair of stereo images and a second feature map of a second image of the pair of stereo images;

compute, based at least on executing the one or more first machine learning models, a first feature vector for a first pixel of the first image of the pair of stereo images based at least on the first feature map of the first image of the pair of stereo images and a second feature vector for a second pixel of the second image of the pair of stereo images based at least on the second feature map of the second image of the pair of stereo images, the second pixel of the second image of the pair of stereo images corresponding to the first pixel of the pair of stereo images;

apply the path disparity model to the first pixel to determine an association between the first feature vector and the second feature vector;

classify at least one of the first pixel or the second pixel as a hazard pixel corresponding to a hazard object on the path of the ego-machine based at least on the association between the first feature vector and the second feature vector; and generate an output indicating a presence of the hazard object on the path of the ego-machine.

14. The system of claim 13, wherein the processing circuitry is further to:

cluster one or more pixels classified as the hazard pixel to generate one or more clusters of pixels; and define a location of the hazard object based at least on the one or more clusters of pixels.

15. The system of claim 13, wherein the determination of the association between the first feature vector and the second feature vector is performed, at least in part, by projecting the first feature vector into the second image at a pixel location determined based at least on the path disparity model.

16. The system of claim 13, wherein the association between the first feature vector and the second feature vector is determined based at least on the one or more first machine learning models processing the first feature vector and the second feature vector; or wherein the association between the first feature vector and the second feature vector is determined based at least on one or more second machine learning models processing the first feature vector and the second feature vector, wherein the one or more second machine learning models are different than the one or more first machine learning models.

17. The system of claim 13, wherein the generation of the path disparity model includes applying a line fitting algorithm to at least a portion of the disparity map.

18. The system of claim 13, wherein at least one of the first pixel or the second pixel is classified based at least on the one or more first machine learning models determining an indication of confidence that the first pixel or the second pixel corresponds to a hazard pixel, and the one or more first machine learning models are trained using end-to-end trained.

19. The system of claim 13, wherein at least one of the first pixel or the second pixel is classified based at least on a combined feature vector, wherein the combined feature vector is generated by combining the first feature vector and the second feature vector.

20. The system of claim 13, wherein the one or more first machine learning models are trained based at least on ground truth data that comprises classification labels corresponding to a drivable region, a non-drivable region, and hazards.

21. The system of claim 13, wherein the processing circuitry is further to filter the pair of stereo images to a region of interest that includes the path of the ego-machine.

22. The system of claim 13, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

23. A method comprising:

determining a location of a first pixel of a first image corresponding to a hazard object on a path of an ego-machine based at least on classifying the first pixel as a hazard pixel, wherein the first pixel is classified as a hazard pixel based at least on a first feature vector corresponding to the first pixel of the first image and a second feature vector corresponding to a second pixel of a second image corresponding to the first pixel, the first feature vector and the second feature vector determined to correspond to one another based at least on applying a path disparity model to the first pixel, the path disparity model being computed based at least on a disparity map generated based at least on the first image and the second image; and based at least on the location of the first pixel corresponding to the hazard object on the path of the ego-machine, performing one or more operations for controlling the ego-machine along the path; or generating an output indicating a presence of the hazard object on the path of the ego-machine.

* * * * *